(12) United States Patent
Reyzin

(10) Patent No.: US 10,269,119 B2
(45) Date of Patent: Apr. 23, 2019

(54) SYSTEM AND METHOD FOR BACKGROUND AND FOREGROUND SEGMENTATION

(71) Applicant: Avigilon Analytics Corporation, Vancouver (CA)

(72) Inventor: Igor Reyzin, Chestnut Hill, MA (US)

(73) Assignee: Avigilon Analytics Corporation, Vancouver (CA)

( * ) Notice: Subject to any disclaimer, the term of this patent is extended or adjusted under 35 U.S.C. 154(b) by 30 days.

(21) Appl. No.: 15/365,478

(22) Filed: Nov. 30, 2016

(65) Prior Publication Data

US 2017/0161905 A1 Jun. 8, 2017

Related U.S. Application Data

(60) Provisional application No. 62/263,983, filed on Dec. 7, 2015.

(51) Int. Cl.
*G06T 7/00* (2017.01)

(52) U.S. Cl.
CPC .. *G06T 7/0081* (2013.01); *G06T 2207/10004* (2013.01); *G06T 2207/20144* (2013.01)

(58) Field of Classification Search
CPC ......... G06T 7/0081; G06T 2207/20144; G06T 2207/10004
See application file for complete search history.

(56) References Cited

U.S. PATENT DOCUMENTS

| 2007/0160289 | A1* | 7/2007 | Lipton | G06K 9/00771 382/173 |
| 2012/0087573 | A1 | 4/2012 | Sharma et al. | |
| 2016/0125621 | A1* | 5/2016 | Saitwal | G06K 9/38 382/165 |

* cited by examiner

*Primary Examiner* — Menatoallah Youssef
(74) *Attorney, Agent, or Firm* — Daniel Hammond

(57) ABSTRACT

A system and method for segmenting a current frame of a video includes receiving a segmentation mask determined from a previous frame of the video, receiving a background model value and a background deviation value for a given pixel of a previous frame of the video, updating the received background deviation value, updating the background model value independently of the updating of the background deviation value and determining a value of a pixel of a new segmentation mask corresponding to the given pixel based on a foreground model value of the current frame, a segmenting background model value of the current frame and a segmentation threshold, the determining of the new segmentation mask defining whether the given pixel is a foreground pixel or a background pixel of the current frame. The segmentation mask is used for detecting objects, classifying objects and detecting events in the scene captured by the camera.

20 Claims, 12 Drawing Sheets

SYSTEM AND METHOD FOR BACKGROUND AND FOREGROUND SEGMENTATION

RELATED APPLICATIONS

This application claims the benefit of U.S. Provisional Patent Application No. 62/263,983 filed Dec. 7, 2015, which is hereby incorporated by reference in its entirety.

FIELD

The present subject-matter relates to segmentation of background and foreground of frames of a video, and more particularly to adaptive segmentation of the frames.

BACKGROUND

Segmentation of background and foreground areas of images of a video serve to separate objects of the video forming the foreground from stationary areas of the images that form the background. Objects located in foreground areas of an image may be objects of interest, such as objects that are moving. Foreground areas may also include objects that were previously moving but then stopped moving.

Background subtraction is a widely used method for detecting moving objects in a video. Typically, this method involves determining a foreground model and a background model of an image of a video and determining whether the distance between pixels of the foreground model and corresponding pixels of the background model exceeds a threshold. This comparison generates a binary image, called a "segmentation mask", which defines which areas of the image of the video is considered to belong to the foreground and which other areas of the image of the video is considered to belong to the background.

Common methods of carrying out background subtraction include frame differencing, frame averaging, median filtering, non-parametric modeling, running Gaussian averages, and a mixture of Gaussians.

SUMMARY

The embodiments described herein provide in one aspect, a computer-implemented method for segmenting a current frame of a video. The method includes receiving a segmentation mask determined from a previous frame of the video, receiving a background model value and a background deviation value for a given pixel of a previous frame of the video, updating the received background deviation value, updating the background model value independently of the updating of the background deviation value, and determining a value of a pixel of a new segmentation mask corresponding to the given pixel based on a foreground model value of the current frame, a segmenting background model value of the current frame and a segmentation threshold, the determining of the new segmentation mask defining whether the given pixel is a foreground pixel or a background pixel of the current frame. The segmenting background model value is one of the received background model value and the updated background model value and the segmentation threshold is based on one of the received background deviation and the updated background deviation value.

The embodiments described herein provide another aspect, a computer-implemented method for segmenting a current frame of a video. The method includes receiving a segmentation mask determined from a previous frame of the video, the segmentation mask defining one or more foreground areas and one or more background areas, for each of a plurality of pixels of a current frame, determining a background deviation value, determining a statistical measure of the background deviation values, for example their mean, calculated for each of the plurality of pixels, for each of the plurality of pixels, determining whether each pixel belongs to a chaotic noise area or a non-chaotic noise area based on a comparison of the statistical measure of the background deviation values with the background deviation value for the pixel, thereby generating a chaotic noise mask, determining a noise ratio of the chaotic noise mask, receiving at least one weighting factor, updating the at least one weighting factor based on whether the chaotic noise mask noise ratio exceeds a chaotic noise threshold, and determining a value for each pixel of a new segmentation mask based on a foreground model of the current frame, a background model of the current frame and the at least one segmentation threshold for the pixel weighted by the at least one weighting factor.

The embodiments described herein provide in another aspect, a computer-implemented method for segmenting a current frame of a video. The method includes determining a noise ratio of a segmentation mask defining one or more foreground areas and one or more background areas of the current frame, determining a background noise ratio of one or more areas of the current frame corresponding to the one or more background areas defined by the segmentation mask, receiving a weighting factor, updating the weighting factor for the given pixel based on the segmentation mask noise ratio and the background noise ratio, and determining a value of a pixel of a new segmentation mask corresponding to the given pixel based on a foreground model of the current frame, a background model of the current frame and a segmentation threshold for the given pixel weighted by one of the received weighting factor and the updated weighting factor.

The embodiments described herein provide in another aspect, a system for segmenting a current frame of a video. The system includes a processor and a computer-readable storage device storing program instructions that when executed by the processor, cause the system to perform operations that include receiving a segmentation mask determined from a previous frame of the video, receiving a background model value and a background deviation value for a given pixel of a previous frame of the video, updating the received background deviation value, updating the background model value independently of the updating of the background deviation value, and determining a value of a pixel of a new segmentation mask corresponding to the given pixel based on a foreground model value of the current frame, a segmenting background model value of the current frame and a segmentation threshold, the determining of the new segmentation mask defining whether the given pixel is a foreground pixel or a background pixel of the current frame. The segmenting background model value is one of the received background model value and the updated background model value; and the segmentation threshold is based on one of the received background deviation and the updated background deviation value.

The embodiments described herein provide in another aspect, a system for segmenting a current frame of a video. The system includes a processor and a computer-readable storage device storing program instructions that when executed by the processor, cause the system to perform operations that include receiving a segmentation mask determined from a previous frame of the video, the segmentation mask defining one or more foreground areas and one or more background areas, for each of a plurality of pixels of a current frame, determining a background deviation value, determining a statistical measure of the background deviation values calculated for each of the plurality of pixels, for each of the plurality of pixels, determining whether each pixel belongs to a chaotic noise area or a non-chaotic noise area based on a comparison of the statistical measure of the background deviation values with the background deviation value for the pixel, thereby generating a chaotic noise mask, determining a noise ratio of the chaotic noise mask, receiving at least one weighting factor, updating the at least one weighting factor based on whether the chaotic noise mask noise ratio exceeds a chaotic noise threshold, and determining a value for each pixel of a new segmentation mask based on a foreground model of the current frame, a background model of the current frame and the at least one segmentation threshold for the pixel weighted by the at least one weighting factor.

The embodiments described herein provide in another aspect, a system for segmenting a current frame of a video. The system includes a processor and a computer-readable storage device storing program instructions that when executed by the processor, cause the system to perform operations that include determining a noise ratio of a segmentation mask defining one or more foreground areas and one or more background areas of the current frame, determining a background noise ratio of one or more areas of the current frame corresponding to the one or more background areas defined by the segmentation mask, receiving a weighting factor, updating the weighting factor for the given pixel based on the segmentation mask noise ratio and the background noise ratio, and determining a value of a pixel of a new segmentation mask corresponding to the given pixel based on a foreground model of the current frame, a background model of the current frame and a segmentation threshold for the given pixel weighted by one of the received weighting factor and the updated weighting factor.

According to some example embodiments, the updating of the received background deviation value for the given pixel is based on the received background deviation value and one of the received segmentation mask and the new segmentation mask and the updating of the received background model value for the given pixel is based on the received background model value and one of the received segmentation mask and the new segmentation mask.

According to some example embodiments, the background model value is updated based on the received background model value weighted by a first learning rate, a value of the given pixel of the current frame weighted by a complementary value of the first learning rate, and whether one of the received segmentation mask and the new segmentation mask defines the given pixel as corresponding to a foreground area or a background area.

According to some example embodiments, updating the background deviation value for the given pixel includes receiving a background average value for the given pixel, updating the background average value based on the received background average value weighted by a second learning rate and the value of the given pixel of the current frame weighted by a complementary value of the second learning rate (, determining a current deviation value as the difference between the value of the given pixel of the current frame and the updated background average value and updating the background deviation value based on the received background deviation value weighted by the second learning rate and the value of the given pixel of the current frame weighted by the complementary of value the second learning rate.

According to some example embodiments, updating the background deviation value is carried out for each pixel of the current frame, thereby generating an updated deviation model, updating the background model is carried out for each pixel of the current frame, thereby generating an updated background model, and determining the new segmentation mask is carried out for each pixel of the current frame. The determining of the new segmentation mask includes for each pixel, comparing the difference between the value of the pixel and the background model value of the pixel against the segmentation threshold for the pixel, thereby generating a raw segmentation mask and filtering the raw segmentation mask, thereby generating the new segmentation mask.

According to some example embodiments, the methods and/or systems further include determining a noise ratio of one of the received segmentation mask and the new segmentation mask, determining a background noise ratio of one or more areas of the current frame corresponding to the one or more background areas defined by the one of the received segmentation mask and the new segmentation mask, receiving a first weighting factor, updating the weighting factor based on the segmentation mask noise ratio and the background noise ratio. and determining the value of the pixel of the new segmentation mask corresponding to the given pixel is based on the segmentation threshold weighted by one of the received weighting factor and the updated weighting factor.

According to some example embodiments, updating the weighting factor includes decreasing the weighting factor if the background noise ratio is greater than the segmentation noise ratio, increasing the weighting factor if the background noise ratio is less than the segmentation noise ratio and the value of the pixel of the new segmentation mask corresponding to the given pixel is set to define a foreground pixel if the difference between the value of the corresponding pixel of the foreground model and the value of the corresponding pixel of the segmenting background model is greater than the segmentation threshold weighted by one of the received weighting factor and the updated weighting factor, and the value of the pixel of the new segmentation mask corresponding to the given pixel is set to define a background pixel if the difference between the value of the corresponding pixel of the foreground model and the value of the corresponding pixel of the segmenting background model is less than the segmentation threshold weighted by the one of the received weighting factor and the updated weighting factor.

According to some example embodiments, the methods and/or systems further include for a subsequent frame of the video, receiving the updated deviation model value, for the subsequent frame, receiving the updated background model value, for the subsequent frame, receiving the new segmentation mask, further updating the updated deviation model value based on properties of the subsequent frame, further updating the updated background model value based on properties of the subsequent frame, and further determining another new segmentation mask based on properties of the subsequent frame.

According to some example embodiments, the methods and/or systems further include determining a statistical measure of the deviation values calculated for each of the plurality of pixels, for each of the plurality of pixels, determining whether each pixel belongs to a chaotic noise area or a non-chaotic noise area based on a comparison of the statistical measure of the background deviation values with the background deviation value for the pixel, thereby generating a chaotic noise mask, determining a noise ratio of the chaotic noise mask, receiving a second weighting factor, updating at least one of the first weighting factor and the second weighting factor based on whether the chaotic noise mask noise ratio exceeds a chaotic noise threshold, and defining the statistical measure of the background deviation values weighted by the first weighting factor as the segmentation threshold for determining the value of the pixel of the new segmentation mask if the statistical measure of the background deviation values weighted by the first weighting factor is greater than the background deviation value weighted by the second weighting factor, and defining the background deviation value for the pixel weighted by the second weighting factor as the segmentation threshold for determining the value of the pixel of the new segmentation mask if the background deviation value for the pixel weighted by the second weighting factor is greater than the statistical measure of the background deviation values weighted by the first weighting factor.

According to some example embodiments, determining whether each pixel belongs to the chaotic noise area or the non-chaotic noise area includes defining the pixel as belonging to the chaotic noise area if the background deviation value for the pixel weighted by the second weighting factor is greater than the statistical measure of the background deviation values weighted by the second weighting factor and defining the pixel as belonging to the non-chaotic noise area if the background deviation value for the pixel weighted by the second weighting factor is less than the statistical measure of the background deviation values weighted by the first weighting factor, the at least one segmentation threshold includes a first segmentation threshold being the statistical measure of the background deviation values and a second segmentation threshold being the background deviation value for the pixel, and updating each pixel of the segmentation mask is based on the first segmentation threshold weighted by the first weighting factor and the second segmentation threshold weighted by the second weighting factor.

According to some example embodiments, the at least one weighting factor includes a first weighting factor and a second weighting factor, determining whether each pixel belongs to a chaotic noise area or a non-chaotic noise area is based on the comparison of the statistical measure of the background deviation values weighted by the first weighting factor with the background deviation value for the pixel weighted by the second weighting factor, the at least one segmentation threshold includes a first segmentation threshold being the statistical measure of the background deviation values and a second segmentation threshold being the background deviation value for the pixel, and determining the value for each pixel of the new segmentation mask is based on the first segmentation threshold weighted by the first weighting factor and the second segmentation threshold weighted by the second weighting factor.

According to some example embodiments, determining whether each pixel belongs to the chaotic noise area or the non-chaotic noise area includes defining the pixel as belonging to the chaotic noise area if the background deviation value for the pixel weighted by the second weighting factor is greater than the statistical measure of the background deviation values weighted by the first weighting factor, and defining the pixel as belonging to the non-chaotic noise area if the background deviation value for the pixel weighted by the second weighting factor is less than the statistical measure of the background deviation values weighted by the first weighting factor.

According to some example embodiments, determining the value of each pixel of the new segmentation mask includes defining the statistical measure of the background deviation values weighted by the first weighting factor as the segmentation threshold for determining the value of the pixel of the new segmentation mask if the statistical measure of the background deviation values weighted by the first weighting factor is greater than the background deviation value weighted by the second weighting factor, and defining the background deviation value for the pixel weighted by the second weighting factor as the segmentation threshold for determining the value of the pixel of the new segmentation mask if the background deviation value for the pixel weighted by the second weighting factor is greater than the statistical measure of the background deviation values weighted by the first weighting factor.

According to some example embodiments, the methods and/or systems further include determining a noise ratio of the new segmentation mask, determining a background noise ratio of one or more areas of the current frame corresponding to the one or more background areas defined by the new segmentation mask, determining a chaotic mask noise ratio and updating the at least one weighting factor includes decreasing the first weighting factor if the background noise is greater than the segmentation noise ratio and the chaotic mask noise ratio is less than a chaotic noise threshold, decreasing the second weighting factor if the background noise is greater than the segmentation noise ratio and the chaotic mask noise ratio is greater than a chaotic noise threshold, increase the first weighting factor if the background noise is less than the segmentation mask noise ratio and the chaotic mask noise ratio is greater than a chaotic noise threshold, and increasing the second weighting factor if the background noise is less than the segmentation mask noise ratio and the chaotic mask noise ratio is less than the chaotic noise threshold.

According to some example embodiments, determining the chaotic noise ratio includes summing the pixel values of the chaotic mask.

BRIEF DESCRIPTION OF THE DRAWINGS

The detailed description refers to the following figures, in which.

Figure 1A:
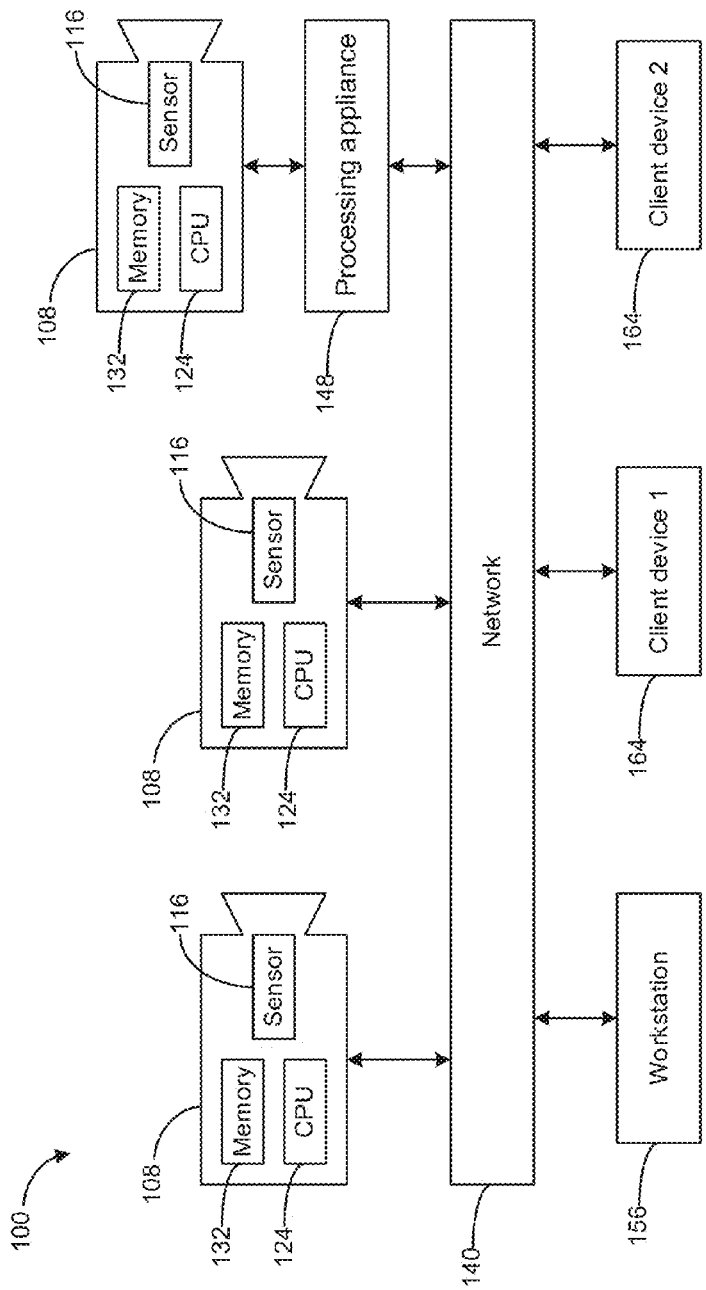
FIG. 1A illustrates a block diagram of connected devices of a video capture and playback system according to an example embodiment.

It will be appreciated that for simplicity and clarity of illustrations, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

"Image data" herein refers to data produced by a video capture device and that represents images captured by the video capture device. The image data may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images. It will be understood that "image data" as used herein can refer to "raw" image data produced by the video captured device and/or to image data that has undergone some form of processing.

A "current image frame" refers to an image frame within the plurality of sequential image frames of a video that is currently being analyzed within various systems and methods described herein. The image data of a current image frame is analyzed to generate information regarding objects captured within the current image frame and/or within a plurality of image frames preceding the current image.

A "previous image frame" of a current image frame refers to an image frame that occurred prior to a current image frame within the plurality of sequential image frames of a video. For example, the previous image frame may be the image frame that immediately preceded the current image frame. Alternatively, the previous image frame may be an earlier image frame of the plurality of sequential image frames, but is sufficiently close to the current image frame so as to be pertinent to the current image frame.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed (ex: lowered quality) and/or re-encoded image data. The processing of the image data may also cause additional information regarding the image data or objects captured within the images to be output. For example, such additional information is commonly understood as metadata. The metadata may also be used for further processing of the image data, such as drawing bounding boxes around detected objects in the image frames.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments", unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise. The term "herein" means "in the present application, including anything which may be incorporated by reference", unless expressly specified otherwise.

The term "e.g.", "ex:" and like terms mean "for example", and thus do not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed aspect(s) are widely applicable to numerous embodiments, as is readily apparent from the disclosure. One of ordinary skill in the art will recognize that the disclosed aspect(s) may be practiced with various modifications and alterations, such as structural and logical modifications. Although particular features of the disclosed aspect(s) may be described with reference to one or more particular embodiments and/or drawings, it should be understood that such features are not limited to usage in the one or more particular embodiments or drawings with reference to which they are described, unless expressly specified otherwise.

No embodiment of method steps or system elements described in the present application is essential or is coextensive, except where it is either expressly stated to be so in this specification or expressly recited in a claim.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer, or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of the video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a surveillance camera, such as any one of a box, pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, such as a CPU, one or more memory devices 132 coupled to the processors and one or more network interfaces. The memory device can include a local memory (e.g. a random access memory and a cache memory) employed during execution of program instructions. The processor executes computer program instruction (e.g., an operating system and/or application programs), which can be stored in the memory device.

In various embodiments the processor 124 may be implemented by any processing circuit having one or more circuit units, including a digital signal processor (DSP), graphics processing unit (GPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may include the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc., or any combination thereof.

In various example embodiments, a plurality of the components of the image capture device 108 may be implemented together within a system on a chip (SOC). For example, the processor 124, the memory device 132 and the network interface may be implemented within a SOC. Furthermore, when implemented in this way, both a general purpose processor and DSP may be implemented together within the SOC.

Continuing with FIG. 1, each of the at least one video capture device 108 is connected to a network 140. Each video capture device 108 is operable to output image data representing images that it captures and to transmit the image data over the network.

It will be understood that the network 140 may be any communications network that provides reception and transmission of data. For example, the network 140 may be a local area network, external network (ex: WAN, Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to the processors. The processing appliance 148 may also include one or more network interfaces.

For example, and as illustrated, the processing appliance 148 is connected to a video capture device 108. The processing appliance 148 may be further connected to the network 140.

According to one exemplary embodiment, and as illustrated in FIG. 1, the video capture and playback system 100 includes at least one workstation 156 (e.g. server), each having one or more processors. The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (ex: mouse, keyboard, touchscreen). The client device 164 is operable to display on its display device a user interface for displaying information, receiving user input, and playing back video. For example, the client device may be any one of a personal computer, laptop, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 1B:
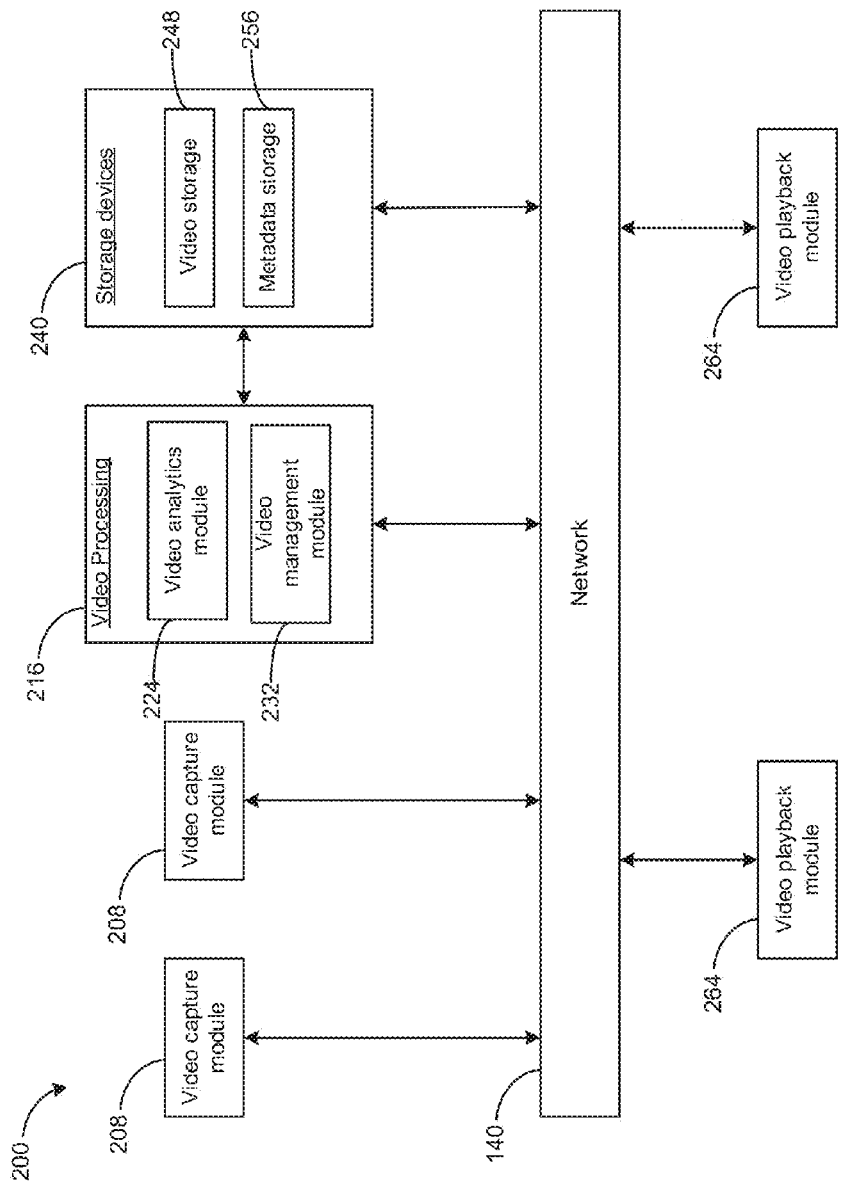
FIG. 1B illustrates a block diagram of a set of operational modules of the video capture and playback system according to one example embodiment.

Referring now to FIG. 1B, therein illustrated is a block diagram of a set 200 of operational modules of the video capture and playback system 100 according to one example embodiment. The operational modules may be implemented in hardware, software or both, on one or more of the devices of the video capture and playback system 100 as illustrated in FIG. 1A.

The set 200 of operational modules include at least one video capture module 208. For example, each video capture device 108 may implement a video capture module 208. The video capture module 208 is operable to control one or more components (ex: sensor 116, etc.) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind", monitoring objects (e.g., to protect from theft), and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further includes a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148, and workstation 156. Similarly, video management functionalities may be split between one or more of an image capture device 108, processing appliance 148, and workstation 156.

Figure 1C:
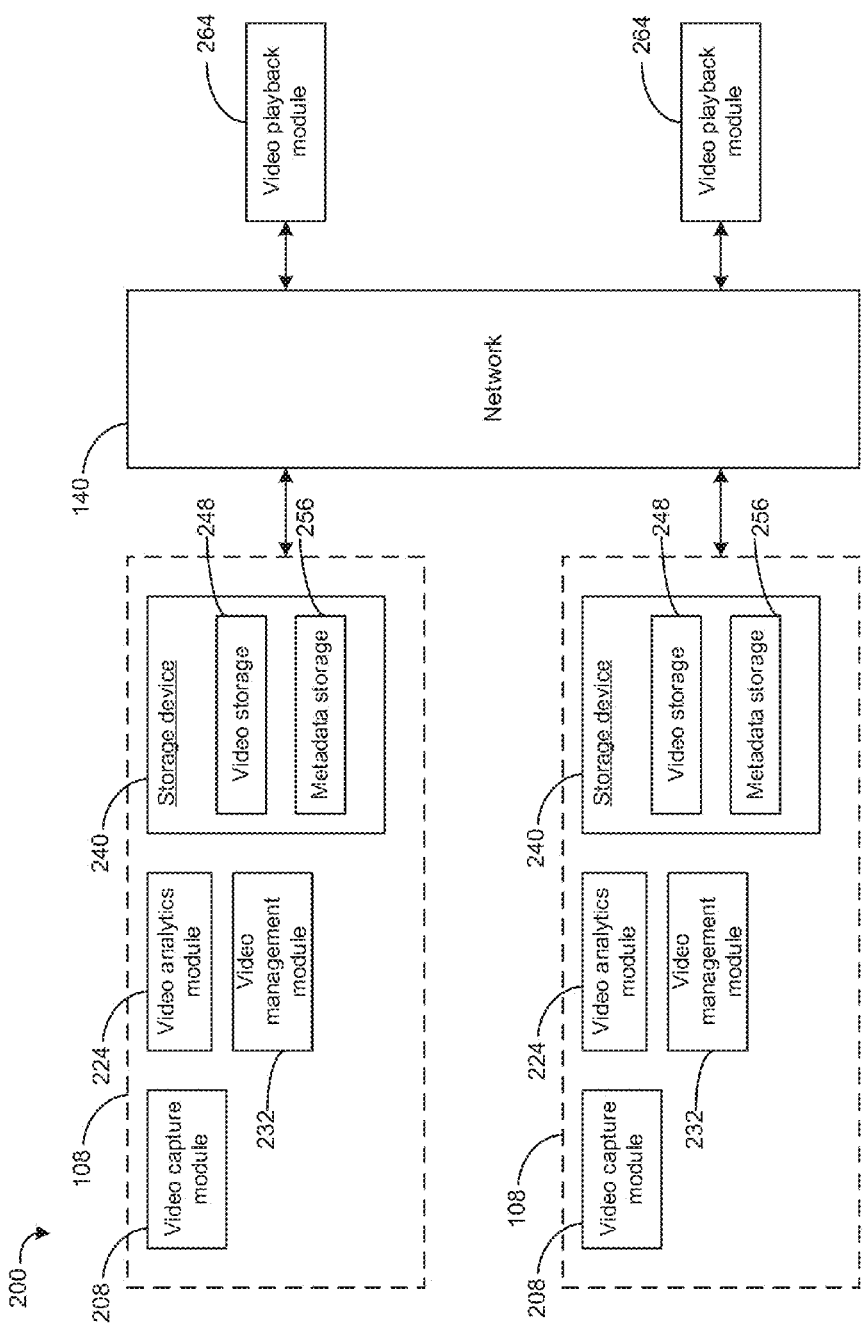
FIG. 1C illustrates a block diagram of a set of operational modules implemented within one device according to one example embodiment.

Referring now to FIG. 1C, therein illustrated is a block diagram of a set 200 of operational modules of the video capture and playback system 100 according to one particular example embodiment wherein the video analytics module 224, the video management module 232 and the storage device 240 is wholly implemented on the one or more image capture devices 108. Accordingly, the video capture and playback system 100 may not require a workstation 156 and/or a processing appliance 148.

It will be appreciated that allowing the subset 216 of image data processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (e.g. manufacturers) or retrofitting an existing video capture and playback system.

Figure 2:
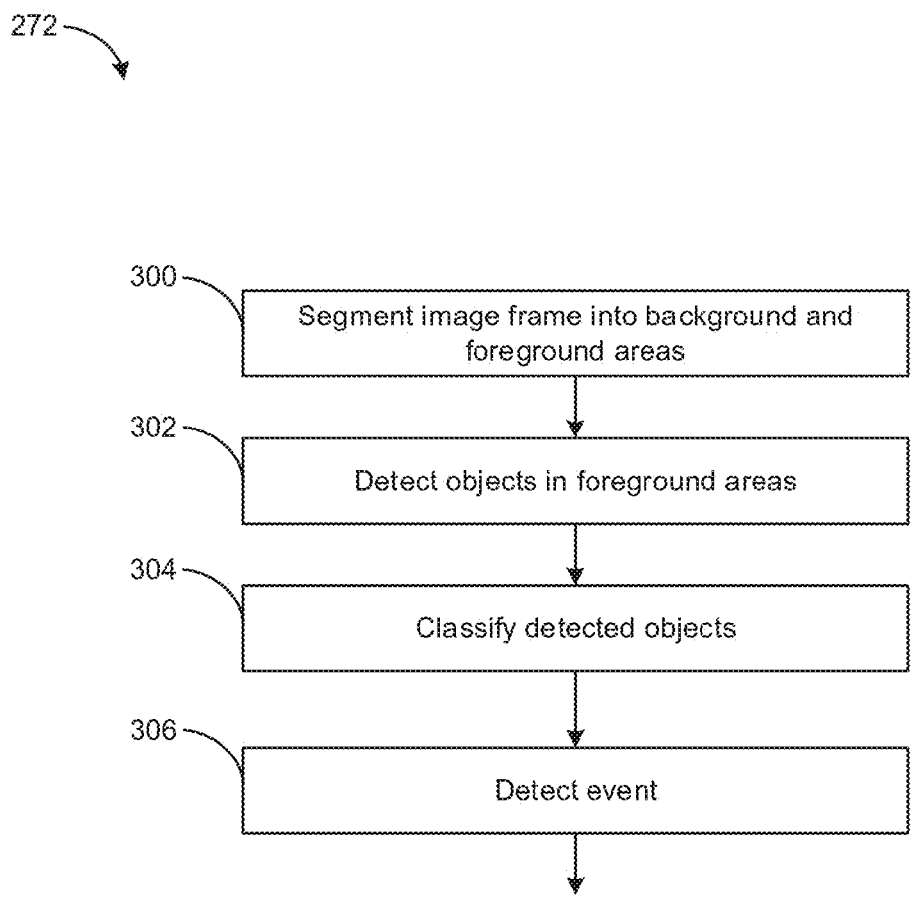
FIG. 2 illustrates a flow chart diagram of an example embodiment of a method for performing video analytics on or more image frames of a captured video.

Referring now to FIG. 2, therein illustrated is a flow chart diagram of an example embodiment of a method 272 for performing video analytics on one or more image frames of a video captured by a video capture device 108. The video analytics may be performed by the video analytics module 224 to determine properties or characteristics of the captured image or video and/or of objects found in the scene captured in the video.

At 300, at least one image frame of the video is segmented into foreground areas and background areas according to various example embodiments described herein. As described elsewhere herein, the segmenting separates areas of the image frame corresponding to moving objects (or previously moving objects) in the captured scene from stationary areas of the scene.

At 302, one or more objects in the scene represented by the image frame are detected based on the segmenting of 300. For example, any discrete contiguous foreground area or "blob" may be identified as an object in the scene. For example, only contiguous foreground areas greater than a certain size (ex: by number of pixels) are identified as an object in the scene.

Metadata may be further generated relating to the detected one or more foreground areas. The metadata may define the location of the object within the image frame. For example, the location metadata may be further used to generate a bounding box (ex: when encoding video or playing back video) outlining the detected object.

A visual indicator may be added to the image frame to visually identify each of the detected one or more objects. The visual indicator may be a bounding box that surrounds the objects within the image frame.

According to various example embodiments, video analytics may end with the detecting of objects in the captured scene.

In other example embodiments, the video analytics may further include, at 304, classifying the objects detected at 302. For example, pattern recognition may be carried out to classify the objects. An object may be classified by type, such as a person, a car, or an animal. Additionally or alternatively, an object may be classified by action, such as movement and the direction of movement of the object. Other classifiers may also be determined, such as color, size, orientation, etc. In more specific examples, classifying the object may include identifying a person based on facial detection and recognizing text, such as a license plate.

The video analytics may further include, at 306, detecting whether an event has occurred and the type of event. Detecting the event may be based on a comparison of the classification of one or more objects with one or more predefined rules. The event may be an event in anomaly detection or business intelligence, such as whether a video tripwire has been triggered, the number of persons present in one area, whether an object has been "left behind" or whether an object has been removed.

Figure 3:
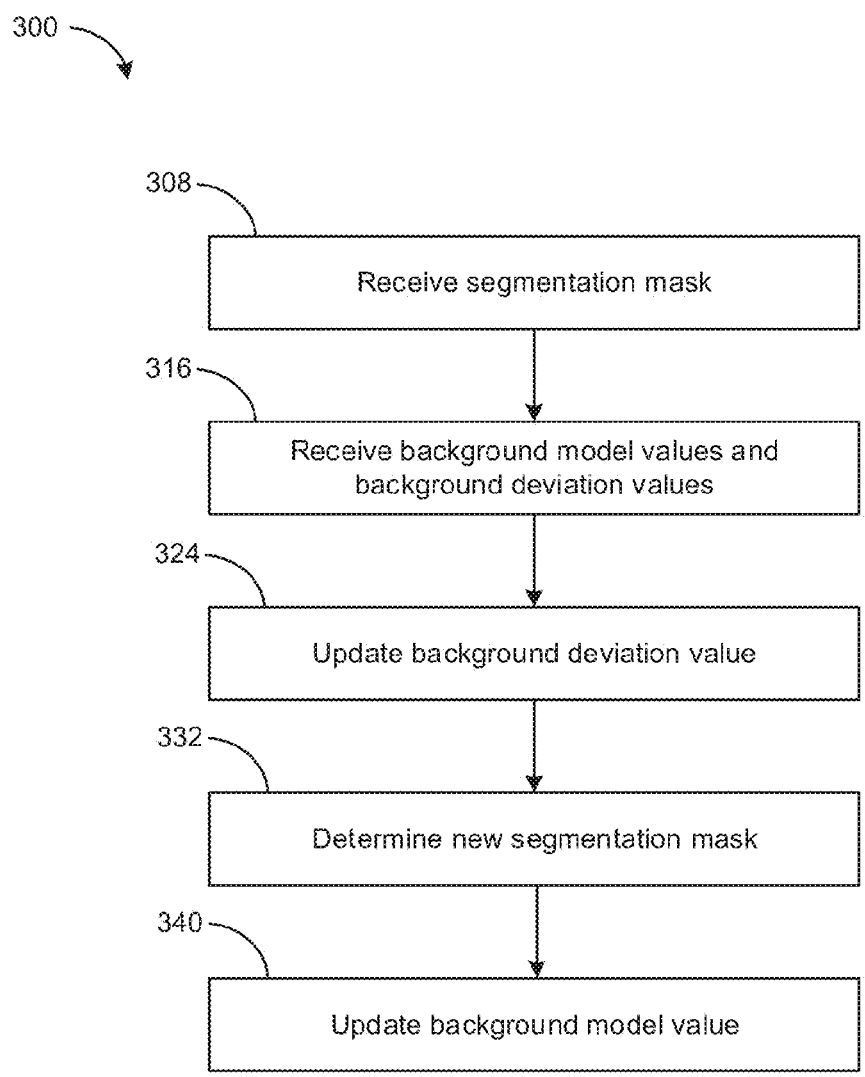
FIG. 3 illustrates a flow chart diagram of an example embodiment of a method for segmenting a given current image frame into background and foreground areas.

Referring now to FIG. 3, therein illustrated is a flow chart diagram of an example embodiment of a method 300 for segmenting a given current image frame into background and foreground areas. For example, this method may be implemented within the video analytics module 224 of the video capture and playback system 100. The example method 300 is applied to a given current image frame within a plurality of sequential image frames forming a video captured by a video capture device 108. As described with reference to FIG. 2, the segmenting of the given current image frame is performed as part of the method 272 for performing video analytics on one or more image frames.

At 308 of example method 300, a segmentation mask determined from a previous image frame is received. The segmentation mask defines one or more foreground areas (e.g. a plurality of foreground pixels) and one or more background areas (e.g. a plurality of background pixels) of the previous image frame. In one example, the segmentation mask defines any area of the image frame that is not a foreground area as belonging to the background area. Accordingly, only one background area is defined. In other areas, different rules (ex: thresholds) may be applied to identify a plurality of background areas that can be distinguished from one another based on one or more properties.

At 316 of example method 300, one or more background model values determined from the previous image frame and one or more background deviation values determined from the previous image frame are received. The one or more background deviation values provide a statistical measure of the spread of background value for one or more pixels. In various example embodiments, standard deviation is used for characterizing the background deviation values.

The background deviation values may be received as a matrix of pixels, each pixel being associated with a corresponding pixel of the image frame and having a background deviation value associated with that pixel determined from the previous image frame. A background deviation value associated with a pixel of an image frame represents the amount by which the pixel value deviates from an average background value for that pixel. For example, the background deviation value associated with a pixel is determined based on the standard deviation of average background values for that pixel.

The background model values may also be received as a matrix of pixels, each pixel being associated with a corresponding pixel of the image frames and having a background model value associated with that pixel determined from the previous image frame. The background model values for an image frame models expected background values for that frame. Accordingly, a background model value associated to the pixel represents an expected value of that pixel if the pixel were to belong to a background area.

At 324 of example method 300, one or more received background deviation values are updated for the current image frame.

At 332 of example method 300, one or more pixels of a new segmentation mask are determined for the current image frame. The value of a given pixel of the new segmentation mask is determined based on the value of a corresponding pixel of a foreground model of the current frame, a value of a corresponding pixel of a segmenting background model and a segmentation threshold for the pixel. The determining of the new segmentation mask defines the foreground pixels and the background pixels of the current frame.

According to one example embodiment for updating a pixel of the received segmentation mask, the difference between the value of the corresponding pixel of the foreground model and the value of corresponding pixel of the segmenting background model is compared to the segmentation threshold for that pixel.

According to various example embodiments, the foreground model value for a pixel is the image value for that pixel.

In some example embodiments, the segmentation threshold for the given pixel may be based on either the received background deviation value or the updated background deviation value for that pixel.

At 340 of example method 300, one or more received background model values are updated for the current frame. For a given pixel of the current background model, the updating of the received background model value associated with that pixel may be based on a combination of that received background model value with the image value of the corresponding pixel of the current frame. For example, the amount of the combination may be based on whether the received segmentation mask or the new segmentation mask defines that pixel as belonging to a foreground area or a background area. The amount of the combination may be further based on a first learning rate.

In some example embodiments, the value of the corresponding pixel of the segmenting background model may be the received background model value for that pixel or the updated background model value for that pixel.

It will be understood that according to some example embodiments, updating the background deviation value at 324, determining the new segmentation mask at 332, and updating the background model at 340 may be carried out on a pixel-by-pixel basis. That is, an updated background deviation value is determined for that given pixel at 324, a value of a pixel of the new segmentation mask corresponding to the given pixel is determined at 332 and a pixel of the background model corresponding to that given pixel is updated at 340. Accordingly, one or more of 324, 332, and 340 may be carried out within a loop, whereby the loop is repeated for a plurality of pixels of the current image frame.

According to various exemplary embodiments, the value of a given pixel of the background model at 340 is updated independently of the updating of the background deviation value of that pixel. That is, the background deviation value of the given pixel is not determined based on the value of the background model for the given pixel. Similarly, the background model value of the given pixel is not determined based on the background deviation value. Accordingly, the background deviation value of a given pixel and the background model value for the same pixel vary over a sequence of image frames of a video independently of one another.

Figure 4:
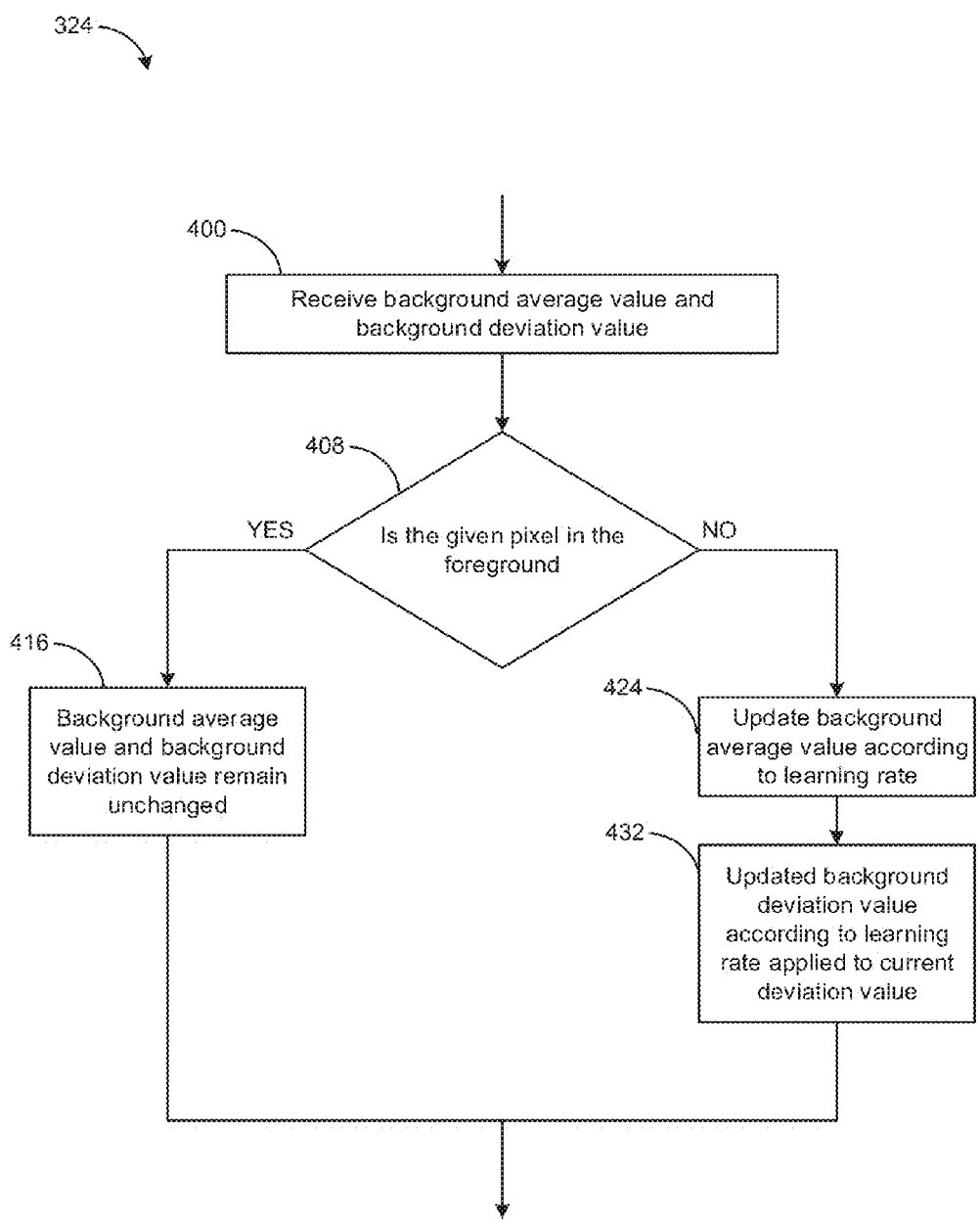
FIG. 4 illustrates a flow chart diagram of an example method for carrying out the updating of a background deviation value for a given pixel of an image frame.

Referring now to FIG. 4, therein illustrated is a flowchart diagram of an example method for carrying out the updating of the background deviation value at 324 of method 300 for a given pixel of the current image frame.

At 400, a background average value and a background deviation value for the given pixel of a previous image frame is received. The background average value corresponds to a weighted average of the values for the given pixel in a plurality of previous image frames. The receiving at 400 may overlap in time with the receiving values at 316 of example method 300.

The received background deviation value may correspond to a weighted average of the deviation values for the given pixel in a plurality of previous image frames.

At 408, it is determined whether an applied segmentation mask defines the given pixel as belonging to the foreground or the background. The applied segmentation mask may be one of the received segmentation mask and the new segmentation mask.

If the given pixel belongs to the foreground, the background average value and the background deviation value for the given pixel remains unchanged at 416 from the values received at 400 and the background average value and the background deviation value for the given pixel in the current image frame is the same as the values for the given pixel in the previous image frame.

If the given pixel belongs to the background, the background average value and the background deviation value for the given pixel are updated.

For example, and as illustrated, at 424, the background average value is updated by applying a learning of a combination of the image value of the given pixel in the current image frame and the background average value for the given pixel in the previous image frame. The amount of learning of the pixel value of the given pixel in the current image frame versus the amount of learning of the pixel value of the background average value for the given pixel in the previous image frame is defined by a second learning rate. For example, the background average value is updated based on the received background average value weighted by the second learning rate and the value of the given pixel in the current frame weighted by a complementary value of the second learning rate. The complementary value of the second learning rate refers to a value that forms a whole value when combined with the second learning rate. For example, if the second learning rate is expressed as a fraction that is less than or equal to one, the complementary value of the second learning rate is equal to one minus the second learning rate. It will be appreciated that as a result of the learning of a combination of the pixel value in the current image frame with background average value for the given pixel, the updated background average value resembles a weighted average of the image value of the pixel in the current image frame with historical image values of that pixel (i.e. image values of that pixel for a plurality of previous image frames).

At 432, a background deviation value is updated for the given pixel based on the updated background average value and a received instantaneous deviation value. The instantaneous deviation value of the given pixel may be calculated for a previous image frame and is described elsewhere herein. For example, the background deviation value is updated by applying a learning of a combination of the received instantaneous deviation value and the received background deviation value for the given pixel in the previous image frame. The amount of learning of the current deviation value of the given pixel in the current frame versus the amount of learning of the background deviation value of the given pixel in the previous image frame is defined by a third learning rate. In some exemplary embodiments, the second learning rate and the third learning rate are substantially equal.

After 416 or 432, the method 300 proceeds to determine the background deviation value for another pixel in the current frame (ex: repeat 324 for another pixel) or to continue method 300.

According to one example embodiment, the updating of the received background deviation value is based on the received segmentation mask (i.e. the applied segmentation mask at 408 is the received segmentation mask). Furthermore, the current deviation value of the given pixel is a value determined for a previous image frame. Accordingly, the updating of the received background deviation value for a given pixel at 324 may be represented by the following equations:

$$\text{BgMean}(x,y,n) = M(x,y,n-1)*\text{BgMean}(x,y,n-1) + (1-M(x,y,n-1))*(b*\text{CurFrame}(x,y,n) + (1-b)*\text{BgMean}(x,y,n-1))$$

Equation 1:

$$\text{BgStd}(x,y,n) = M(x,y,n-1)*\text{BgStd}(x,y,n-1) + (1-M(x,y,n-1))*(b*\text{CurBgStd}(x,y,n-1) + (1-b)*\text{BgStd}(x,y,n-1))$$

Equation 2:

where (x,y) denotes the position of the given pixel within the frame, n denotes the position of the current frame within the plurality of sequential image frames within the video, BgMean denotes a background average value, CurFrame denotes the current image frame, BgStd denotes the background deviation value, CurBgStd denotes an instantaneous deviation value and b is the second learning rate. M denotes the segmentation mask wherein a value of 1 for a given pixel of the segmentation mask denotes that that pixel is a foreground pixel and a value of 0 denotes that that pixel is a background pixel.

Figure 5:
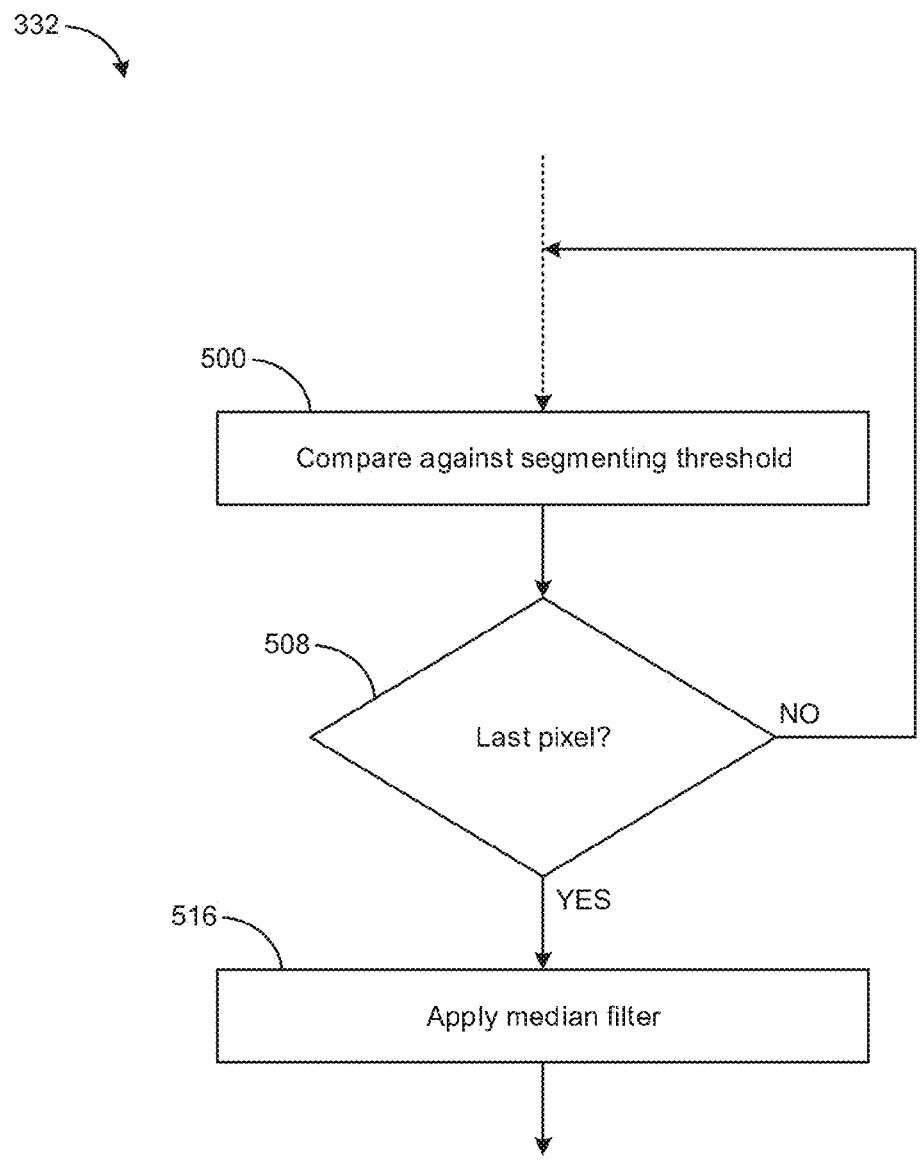
FIG. 5 illustrates a flow chart diagram of an example method for carrying out the updating of the segmentation mask for an image frame.

Referring now to FIG. 5, therein illustrated is a flow chart diagram of an example method for carrying out determining the new segmentation mask at 332 of method 300.

At 500, for a given pixel of the received segmentation mask, the difference between the value of the corresponding pixel of the foreground model and the value of the corresponding pixel of the segmenting background model is compared with the segmentation threshold for that pixel.

As described elsewhere herein, the segmentation threshold for the given pixel may be based on either the received background deviation value or the updated background deviation value for that pixel. Also, as described elsewhere herein, the value of the corresponding pixel of the segmenting background model may be the received background model value for that pixel or the updated background model value for that pixel.

At 508, it is determined whether there remains the values of other pixels of the new segmentation mask that need to be determined. If other pixels remain, the method returns to 500 to determine the value of another pixel of the segmentation mask.

The determining of the new segmentation mask generates a raw updated segmentation mask. The raw updated segmentation mask may include a plurality of noisy pixels. These noisy pixels may show up as isolated "salt" pixels.

Figure 6A:
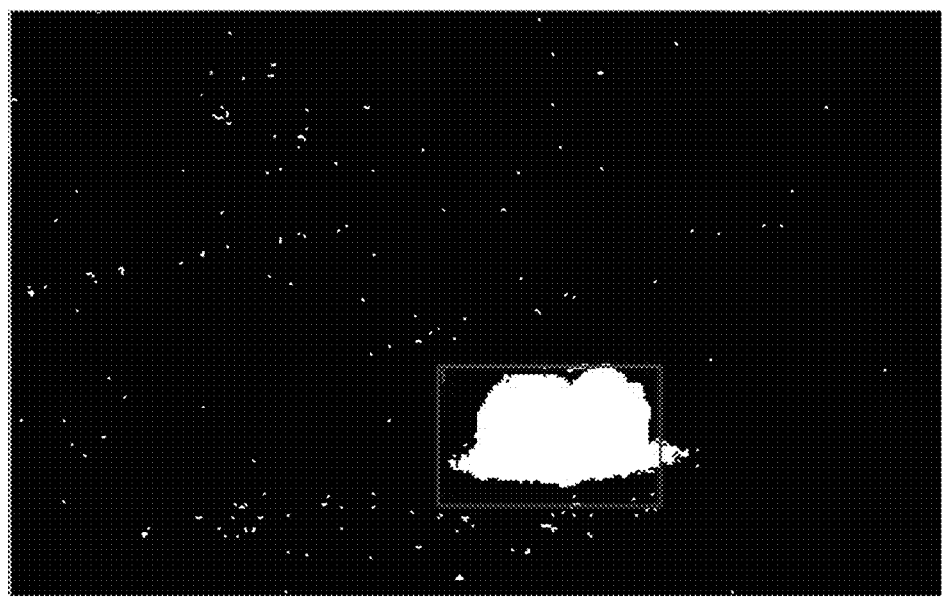
FIG. 6A is a visual representation of a raw segmentation mask according to one example.

For example, FIG. 6A shows a visual representation of an example raw segmentation mask wherein foreground pixels are shown in white while background pixels are shown in black. It will be appreciated that the contiguous foreground area corresponds to a moving object in the scene captured by the video capture device.

According to some example embodiments, the determining of the new segmentation mask includes filtering the raw segmentation mask at 516 to remove noisy pixels in the new raw segmentation mask from the foreground. For example, a median filter may be applied to the new raw segmentation mask, wherein the filtered new raw segmentation mask corresponds to the new segmentation mask for the current frame.

According to one example embodiment, the determining of the new segmentation mask is based on the updated background deviation value and the received (non-updated) background model. Furthermore, the foreground model value for a given pixel is taken as the value of that pixel within the current frame. Accordingly, the determining of a given pixel of the new segmentation mask may be denoted by the following equation:

$$\text{SegMaskRaw}(x,y,n) = |\text{CurFrame}(x,y,n) - \text{BgModel}(x,y, n-1)| > T(x,y,n) \quad \text{Equation 3:}$$

where SegMaskRaw denotes the new raw segmentation mask, BgModel denotes the background model and T denotes the segmentation threshold.

Furthermore, after computing a complete new raw segmentation mask, the new segmentation mask may be denoted by the following equation:

$$M(x,y,n) = \text{SegMask}(x,y,n) = \text{Median}(\text{SegMaskRaw}(x,y,n)) \quad \text{Equation 4:}$$

where M denotes the new segmentation mask and Median( ) denotes applying a median filter.

Figure 6B:
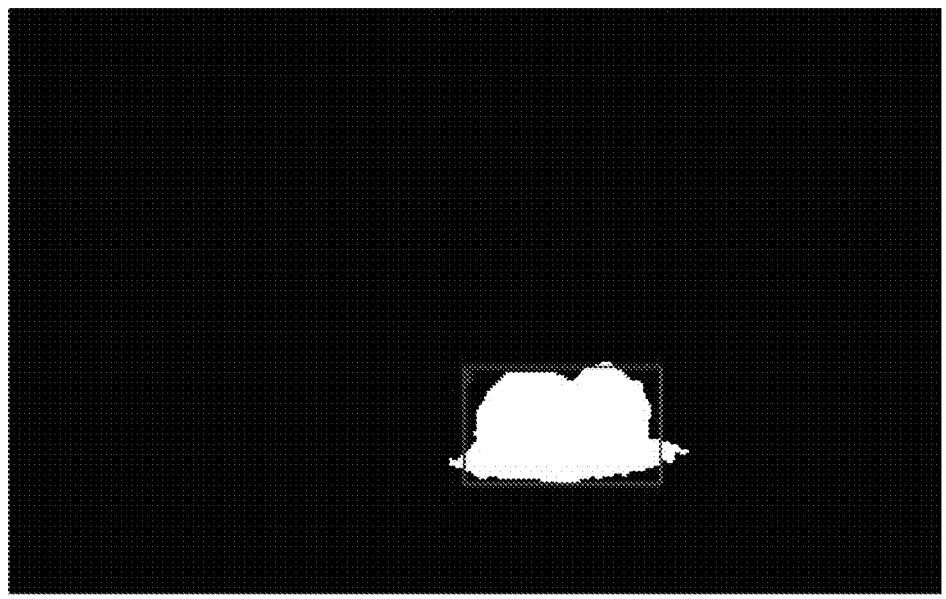
FIG. 6B is a visual representation of the new segmentation after filtering the raw segmentation mask according to one example.

FIG. 6B shows a visual representation of the new segmentation mask after filtering. It will be appreciated that noisy pixels present in the representation of the raw segmentation mask in FIG. 6A have been removed.

Figure 7:
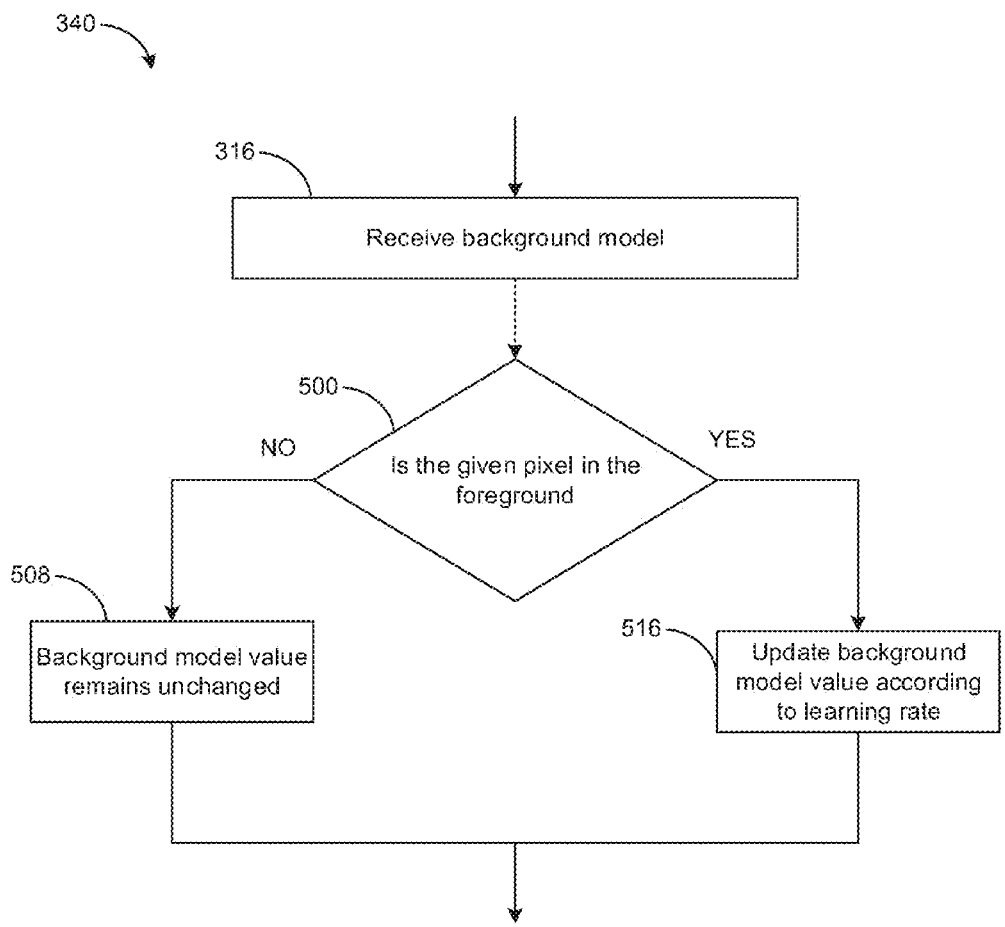
FIG. 7 illustrates a flow chart diagram of an example method for carrying out the updating of a background model value for a given pixel of an image frame.

Referring now to FIG. 7, therein illustrated is a flow chart diagram of an example method for carrying out the updating of the background model value at 340 of method 300 for a given pixel in the current image frame.

At 316, a background model value for a previous image frame of the video is received.

At 500, it is determined whether the applied segmentation mask defines the given pixel as belonging to the foreground or the background. The applied segmentation mask may be one of the received segmentation mask and the new segmentation mask.

If the given pixel belongs to the foreground, the background model value for the given pixel remains unchanged at 508 from the values received at 316 and the background model value for the given pixel in the current image frame is the same as the received background model value for the given pixel in the previous image frame.

If the given pixel belongs to the background, the background model value for the given pixel is updated at 516.

According to one example embodiment, the background model value for the given pixel is updated by applying a learning of a combination of the value of the given pixel in the current image frame and the received background model value for the given pixel in the previous image frame. The amount of learning of the image value of the given pixel in the current image versus the amount of learning of the value of the background model value for the given pixel in the previous image frame is defined by the first learning rate. For example, the background model value is updated based on the received background model value weighted by the first learning rate and the value of the given pixel in the current frame weighted by a complementary value of the first learning rate. The complementary value of the first learning rate refers to a value that forms a whole value when combined with the first learning rate. For example, if the first learning rate is expressed as a fraction that is less than or equal to one, the complementary value of the first learning rate is equal to one minus the first learning rate. It will be appreciated that as a result of the learning of a combination of the image value in the current image frame with the received background model for the given pixel, the updated background model value resembles a weighted average of the image value of the pixel in the current image frame with historical image values of that pixel (i.e. image values over a plurality of previous image frames).

It will be further appreciated that by having a first learning rate that is different from the second learning rate, the weighted average forming the background model value is different and determined independently of the weighted average forming the background average value and the background deviation value.

After 508 or 516, the method proceeds to generate the background model for another pixel in the current frame (ex: repeat 340 for another pixel) or to continue method 300.

According to one example embodiment, the updating of the received background model is carried out after determining the new segmentation mask and is based on the new segmentation mask as determined at 332 (i.e. the applied segmentation mask at 500 is the new segmentation mask). Accordingly, the updating of the received background model value for a given pixel at 340 may be denoted by the following equation:

$$BgModel(x,y,n)=M(x,y,n)*BgModel(x,y,n-1)+(1-M(x,y,n))*(a*CurFrame(x,y,n)+(1-a)*BgModel(x,y,n-1)) \quad \text{Equation 5:}$$

where BgModel is the background model value and a is the first learning rate.

It will be appreciated that the degree by which the value of the background model determined at 332 is influenced by past values of the background model is dependent on the first learning rate. For example, referring back to Equation 5, a higher first learning rate a causes the value of the background model to be more heavily influenced by the value of the given pixel for the current image frame and less heavily influenced by the value of the background model value of the given pixel for the previous image frame.

Similarly, it will be appreciated that the degree by which the value of the background deviation value determined at 324 is influenced by past values of the background deviation value is dependent on the second learning rate. For example, referring back to Equations 1 and 2, a lesser second learning rate b causes the value of the background deviation value to be less heavily influenced by the value of the instantaneous deviation value of the given pixel for the current image frame and more heavily influenced by the value of the background deviation value of the given pixel for the previous image frame.

It will be further appreciated that by having a first learning rate that is different from the second learning rate, the values of the background model for a given pixel in image frames will differ from the values of the background average value for the same given pixel. As a result, they are determined independently of one another.

In various example embodiments, the first learning rate is higher than the second learning rate. As a result, the value of the background model for a given pixel will fluctuate more quickly over a sequence of image frames than the background average value and the background deviation value for the same given pixel.

According to various example embodiments, the first learning rate a has a value of between about 0.01 to about 0.1.

In some example embodiments, the first learning rate a may have a value of between about 0.02 and about 0.06.

In some example embodiments, the first learning rate a may have a value of about 0.04.

In some example embodiments, the first learning rate a may be gradually varied during initialization. During initialization of the first learning rate a of a given frame has a value of [1/(frameNumber+1)], wherein frameNumber is the position of the given frame during initialization. Accordingly, as frameNumber is incremented in each frame, the first learning rate α is gradually decreasing. The first learning rate a is adjusted in this way until the frameNumber reaches a learning threshold.

For example, the learning threshold for the first learning rate a is between 9 and 99.

For example, the learning threshold for the first learning rate a is between 16 and 49.

For example, the learning threshold for the first learning rate a is 24.

According to various example embodiments, the second learning rate b has a value of between about 0.00001 to about 0.01.

In some embodiments, the second learning rate b may have a value of between about 0.00005 and about 0.0002.

In some embodiments, the second learning rate b may have a value of about 0.0001.

In some example embodiments, the second learning rate b may be gradually varied during initialization. During initialization of the second learning rate b of a given frame has a value of [1/(frameNumber+1)], wherein frameNumber is the position of the given frame during initialization. Accordingly, as frameNumber is incremented in each frame, the second learning rate b is gradually decreasing. The second learning rate b is adjusted in this way until the frameNumber reaches a second learning threshold.

For example, the second learning threshold for the second learning rate b is between about 100 and about 100,000.

For example, the second learning threshold for the second learning rate b is between about 5000 and about 20,000.

For example, the second learning threshold for the second learning rate b is about 10,000.

According to some example embodiments, the first learning rate a and the second learning rate b are each reinitialized when there a significant change in the scene represented from one scene to another. This may correspond to the camera being moved. The first learning rate a and the second learning rate b are then reset and reinitialized in the same way as their initialization as described herein above.

A significant change in the scene may be detected when a large portion of the segmentation mask defines foreground areas. For example, the detecting of whether a significant change in scene has occurred includes determining the ratio of foreground areas to background areas and comparing the ratio against a threshold. In some examples, the first and second learning rates are reset when the ratio of foreground areas to background areas exceeds about 1. Other thresholds may be used for resetting the first and second learning rates.

According to various example embodiments, the segmenting of the current image frame further includes determining an instantaneous deviation value of a given pixel for the current image frame. As described elsewhere herein, the instantaneous deviation value is used for updating a background deviation value according to some example embodiments.

It is determined whether a segmentation mask defines the given pixel as belonging to the foreground or the background. The segmentation mask may be one of the received segmentation mask and the new segmentation mask.

If the given pixel belongs to the foreground, the instantaneous deviation value is set to equal the background deviation value.

If the given pixel belongs to the background, the instantaneous deviation value is determined as the difference between the image value of the given pixel of the current frame and a background average value for the given pixel.

According to one example embodiment, the determining of the instantaneous deviation value is carried out after updating the received background deviation value at 324 and determining the new segmentation mask at 332. Accordingly, the instantaneous deviation value is determined based on the new segmentation mask, the updated background average value for the pixel and the updated background deviation value. The instantaneous deviation value is then applied as the received instantaneous deviation value when further updating the background deviation value for a subsequent image frame.

Referring back to FIG. 3, it will be understood that the illustrated ordering of the updating of background deviation values at 324, determining the new segmentation mask at 332 and updating the background model at 340 is for example purposes only. In other example embodiments, the order of 324, 332 and 340 may be different as long as they are each performed for the current frame. This allows these values to be up-to-date to keep up with changes in the pixel image values over multiple frames.

In various example embodiments, the updating of the background deviation value at 324 may be based on the received segmentation mask or the new segmentation mask as the applied segmentation mask depending on whether it is carried out before or after the determining of the new segmentation mask at 332. For example, the determining of the instantaneous deviation value for a pixel may be represented by the following equation:

$$CurBgStd(x,y,n)=M(x,y,n)*BgStd(x,y,n)+(1-M(x,y,n))*|CurFrame(x,y,n)-BgMean(x,y,n)|$$

Accordingly, in various example embodiments, the updating of the segmentation mask at 332 may be based on the received background deviation value or the updated background deviation value as the segmentation threshold depending on whether it is carried out before or after the updating of the background deviation value at 324. Similarly, the determining of the new segmentation mask at 332 may be based on the received background model value or the updated background model value as the segmenting background model value based on whether it is carried out before or after the updating of the background model value at 340.

In various example embodiments, the updating of the background model value at 340 may be based on the received segmentation mask or the new segmentation mask depending on whether it is carried out before or after the determining of the new segmentation mask at 332.

It will be understood that the ability to interchange the ordering of the updating of background deviation values at 324, determining the new segmentation mask at 332, and updating the background model at 340 according to various example embodiments is due in part to the slow changing nature of the background deviation values and background model values over image frames that are near one another in the sequence of image frames of the video. Accordingly, in various example embodiments, whether a particular value is updated based on another received value (corresponding to a value determined for a previous image frame) or another updated value (corresponding to a value determined for the current image frame) will not substantially affect the outputted results, such as the new segmentation mask. However, as described elsewhere herein, the updating of background deviation values at 324, determining the new segmentation at 332, and updating the background model at 340 should be carried regularly over multiple frames to be kept up to date with changes in pixel values over the multiple frames.

The example embodiments described herein are for segmenting a current image frame. The updated deviation model values, updated background models, and new segmentation mask are further received for a subsequent image frame. The updated background deviation model values may be further updated based on pixel image values of the subsequent image frame. The updated background model values may also be further updated based on pixel image values of the subsequent image frame. Furthermore, a second new segmentation mask may also be further determined based on pixel image values of the subsequent image frame.

According to various example embodiments, the determining a given pixel value of the segmentation mask at 332 is based on the segmentation threshold for that pixel weighted by a weighting factor. The weighting factor is adaptively updated over the sequence of image frames and adjusts the sensitivity of the segmentation threshold applied for determining the segmentation mask. For example, the adjusting of the weighting factor ensures that the segmentation threshold that is applied for determining the segmentation mask is not excessively sensitive, which may otherwise result in excess noise in the segmentation mask and false positives in identifying areas as being part of the foreground. Conversely, the adjusting of the weighting factor may also ensure that the segmentation threshold that is applied for determining the pixel value of the new segmentation mask is not under-sensitive, which may otherwise result in false negatives or ignoring areas that should be part of a foreground area.

Figure 8:
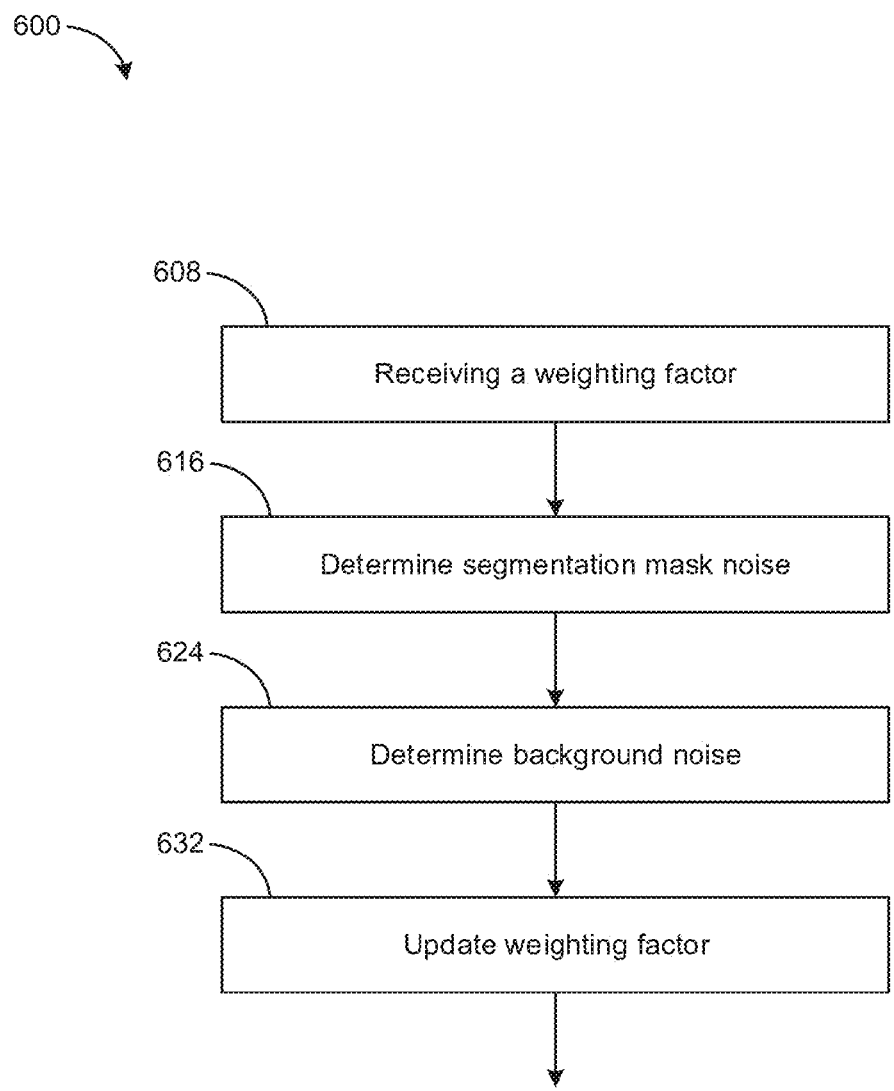
FIG. 8 illustrates a flow chart diagram of an example method for updating a received weighting factor for weighting an applied segmentation threshold.

Referring now to FIG. 8, therein illustrated is a flowchart diagram of a method 600 for updating a received weighting factor applied to weighting an applied segmentation threshold according to various example embodiments. It will be appreciated that the weighting factor is determined as a global weighting factor for the current image frame. That is, the same weighting factor is applied for each pixel in an image frame. The method 600 may be included as part of the determining of the new segmentation mask at 332. Alternatively, the method 600 may be carried out separately within method 300.

At 608, weighting factor(s) are received. This weighting factor is one that was determined or updated for a previous image frame.

At 616, the noise of the segmentation mask is determined. The noise may be determined for one of the received segmentation mask or the new segmentation mask. For example, the segmentation mask noise may be determined by comparing the raw segmentation mask with the filtered segmentation mask to identify those pixels of the raw segmentation mask that are noise pixels. The number of noise pixels may then be counted to determine the total noise of the segmentation mask.

At 624, the background noise of an image frame is determined. The image frame may be the previous image frame or the current image frame. According to one example embodiment, the background noise is determined as the average of the difference between the image value of each pixel in the image frame belonging to a background area and the value of the corresponding pixel of the background model for the image frame. It will be understood that pixels denoted as belonging to a foreground area are not used for computing the background noise.

At 632, the weighting factor is updated based on the segmentation mask noise determined at 616 and the background noise determined at 624.

The comparison of the segmentation noise with the background noise may be made using a normalized value of the segmentation noise (i.e. segmentation mask noise ratio) and a normalized value of the background noise (i.e. background noise ratio).

The weighting factor acts to increase or decrease the segmentation threshold based on properties of the current frame, such as the noise found within the received segmentation mask and the noise in the background areas of the image frame.

According to one exemplary embodiment for updating the weighting factor, the weighting factor is decreased if the segmentation noise is less than the background noise. This results in lowering the threshold applied for segmenting the current image frame, which increases the sensitivity in determining that a given pixel belongs to the foreground.

The weighting factor is increased if the segmentation noise is greater than the background noise. This results in increasing the threshold applied for segmenting the current image frame, which decreases the sensitivity in determining that a given pixel belongs to the foreground.

According to one example embodiment, the received weighting factor is updated based on the new segmentation mask for the current image frame and the background model updated for the current image frame.

Accordingly, the determination of the background noise may be represented by the following equation:

$$\text{BgNoise}(n) = \text{Mean}((1-M(x,y,n))*|\text{CurFrame}(x,y,n) - \text{BgModel}(x,y,n)|) \quad \text{Equation 7:}$$

where BgNoise is the background noise for the current frame.

For example, the background noise ratio is equal to the total background noise ratio divided by the total area of the background areas of the current image frame as denoted by the received segmentation mask, which may be represented by the following equation:

$$\text{BgNoiseRatio}(n) = \text{BgNoise}(n)/<\text{Background area}> \quad \text{Equation 8:}$$

where BgNoiseRatio is the background noise ratio and <Background area> is the total area of background areas of the current image.

Furthermore, the determination of the segmentation noise ratio may be represented by the following equation:

$$\text{SegMaskNoise}(n) = \text{Sum}(\text{SegMaskRaw}(x,y,n) \,\&\, \text{NOT}(\text{SegMask}(x,y,n))) \quad \text{Equation 9:}$$

For example, the segmentation mask noise ratio is equal to the total segmentation noise divided by the total area of the current image frame and may be represented by the equation:

$$\text{SegMaskNoiseRatio}(n) = \text{SegMaskNoise}(n)/<\text{frame area}> \quad \text{Equation 9:}$$

According to various exemplary embodiments, when comparing the segmentation noise ratio with the background noise ratio, a sensitivity factor may be applied to one of the segmentation noise ratio and the background noise ratio. The sensitivity factor weighs either the segmentation noise ratio or the background noise ratio when comparing the two noise ratios. The sensitivity factor is applied to select a desired operating point and corresponds to selecting a tradeoff between false positives and false negatives.

The logical decisions for updating the weighting factor may be denoted by the following pseudocode:

```
if (SegMaskNoiseRatio(n)<C*BgNoiseRatio)
    c1(n)=c1(n-1)*UpdateFactor;
else
    c1(n)=c1(n-1)/UpdateFactor;
``` where C is the sensitivity factor and UpdateFactor is the factor used for adjusting (increasing or decreasing) the weighting factor.

It will be appreciated that a higher sensitivity factor (ex: C>1) increases the background noise ratio during the comparison, which will lead the weighting factor to be decreased more often. This will increase the overall sensitivity to determining that a pixel belongs to the background area. An overall sensitivity that is too high can generate more noise in the new segmentation mask and cause false positives (i.e. classifying background areas of the scene as being foreground objects).

By contrast, a lower sensitivity factor (ex: C<1) increases the background noise ratio during the comparison, which will lead the weighting factor to be increased more often. This will decrease the overall sensitivity to determining that a pixel belongs to a foreground area. An overall sensitivity that is too low can cause false negatives (i.e. misclassifying moving objects in the scene as belonging to the background).

It will be appreciated that the value of the UpdateFactor determines how quickly the weighting factor is adjusted. The value of the UpdateFactor is lower than 1. For example, the value of the UpdateFactor is between about 0.85 and about 0.95.

Accordingly, the segmentation threshold for a given pixel weighted by the updated weighting factor may be represented by the following equation:

$$T(x,y,n) = c1(n)*\text{BgStd}(x,y,n) \quad \text{Equation 10:}$$

It will be appreciated that in other example embodiments, the segmentation mask noise may be determined based on the received segmentation mask determined for the previous image frame. Similarly, the background noise may be determined based on the received (non-updated) background model determined for the previous image frame.

Figure 9:
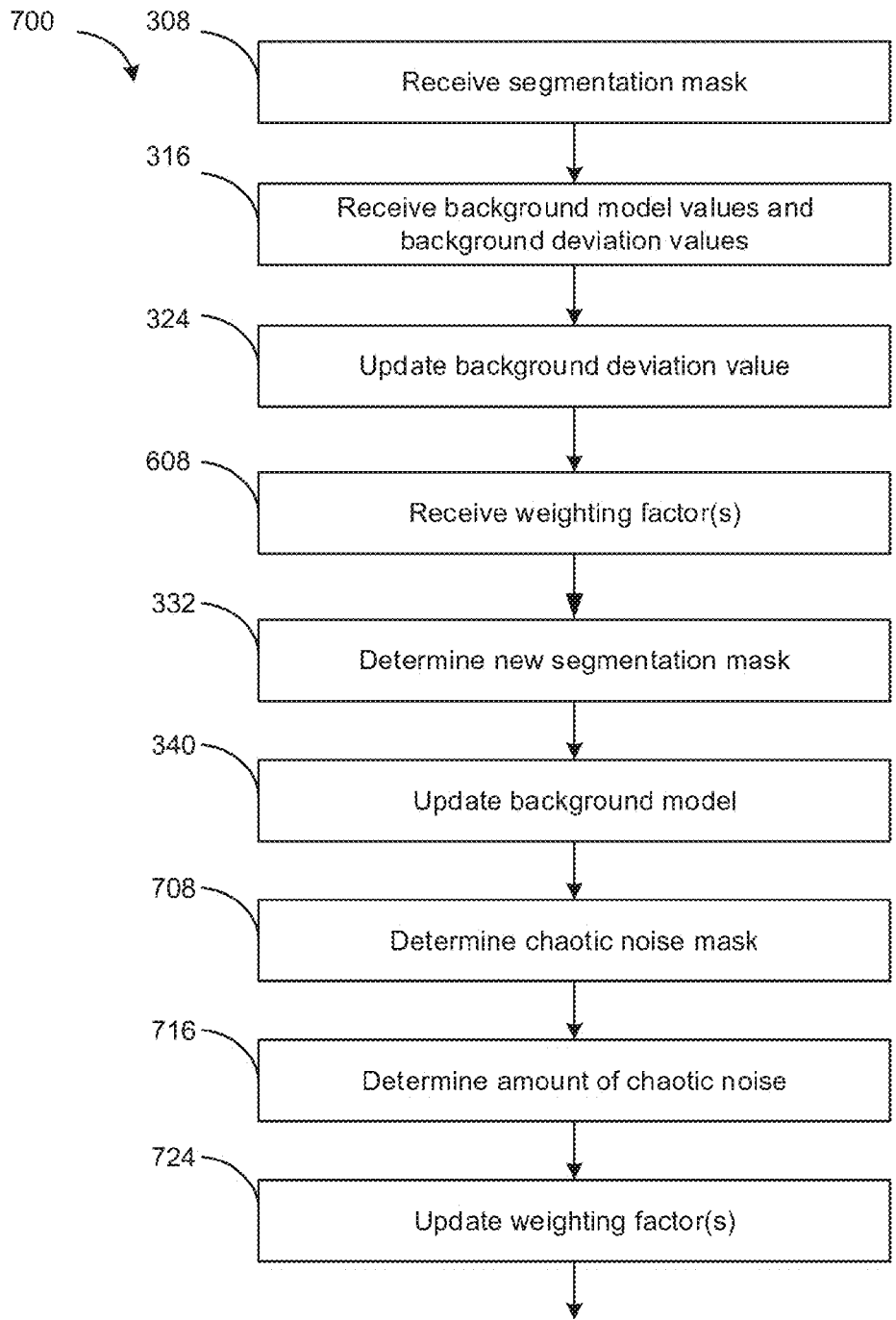
FIG. 9 illustrates a flow chart diagram of an example method for segmenting a current image frame into background areas and foreground areas while taking into account chaotic noise in the sequence of image frames.

Referring now to FIG. 9, therein illustrated is a flow chart diagram of an example embodiment of a method 700 for segmenting a given current image frame into background and foreground areas while taking into account chaotic noise in the sequence of image frames.

Chaotic noise herein refers to objects captured within the field of view of the video capture device 108 that exhibit movement but nonetheless should belong to the background. For example, objects that produce chaotic noise may include leaves swaying in the wind, ripples in a body of water, stationary objects with moving part (ex: fans).

At 308, a segmentation mask determined from a previous image frame of the video is received. Determining a segmentation mask at 308 of method 700 substantially corresponds to determining a segmentation mask at 308 of method 300.

At 316, one or more background model values determined from the previous image frame and one or more background deviation values determined from the previous image frame are received. Receiving these values at 316 of method 700 substantially corresponds to receiving these values at 316 of method 300.

At 324, one or more received background deviation values are updated for the current image frame. Receiving background deviation values at 324 of method 700 substantially corresponds to receiving background deviation values at 316 of method 300.

At 608, one or more weighting factors are received. The one or more weighting factors may be determined or updated for a previous image frame.

At 332, a new segmentation mask is determined for the current frame. Determining the new segmentation mask at 332 of method 700 substantially corresponds to the determining of the new segmentation mask at 332 of method 300. The determining of the new segmentation mask is based on one or more segmentation thresholds weighted by the one or more received weighting factors.

At 340, one or more received background model values are updated for the current frame. Updating one or more received background model values for the current frame at 340 of method 700 substantially corresponds to updating the received background model values at 340 of method 300.

At 708, a chaotic noise mask is determined for the current image frame. The chaotic noise mask includes a matrix of pixels, each pixel being associated to a corresponding pixel of the image frames and having a value defining whether the corresponding pixel in the current image frame exhibits chaotic noise or does not exhibit chaotic noise. As described elsewhere, the chaotic mask may be used to select an appropriate segmentation threshold for determining another new segmentation mask for subsequent image frames. Additionally, or alternatively, the chaotic mask may be used to update one or more weighting factors used for weighting the segmentation threshold.

At 716, the amount of chaotic noise within the current image frame is determined. This amount may be determined from the chaotic noise mask, such as by summing the number of pixels that are defined as exhibiting chaotic noise.

At 724, at least one of the received weighting factor(s) is updated. The updating of the at least one weighting factor is based in part on the amount of chaotic noise.

According to various example embodiments, wherein determining the chaotic noise mask at 708, determining the amount of chaotic noise at 716, and updating the weighting factor(s) are carried out after determining the new segmentation mask at 332 and updating the background model values at 340, and updating the background deviation value at 324 is carried out for each pixel of the current image frame prior to determining the amount of chaotic noise at 716. Furthermore, determining the new segmentation mask at 332 and updating the background model values at 340 may be carried out for each of the pixels of the current image frame prior to determining the amount of chaotic noise at 716.

According to various exemplary embodiments, the determining of a given pixel of the new segmentation mask includes selecting an applicable segmentation threshold for that pixel. A first potential threshold corresponds to a statistical measure of the background deviation values of a plurality of pixels weighted by a first weighting factor. The statistical measure of the background deviation values may be a mean, a median or a minimal value of the background deviation values. A second potential threshold corresponds to the background deviation value for the pixel weighted by a second weighting factor. The greater of the first potential threshold and the second potential threshold is selected as the applicable segmentation threshold for the given pixel. For example, the selection of the applicable threshold may be represented by the equation:

$$T(x,y,n)=\max(c1(n-1)*\text{BgStdMean}(n-1), c2(n-1)*\text{BgStd}(x,y,n-1))$$ Equation 11:

where c1 is the first weighting factor and c2 is the second weighting factor.

It will be appreciated that the first weighting factor, the second weighting factor, the statistical measure of the background deviation values and the background deviation value used for choosing the applicable segmentation threshold are ones that were determined for the previous image frame. However it will be understood that in other examples one or more of the first weighting factor, the second weighting factor, the statistical measure of the background deviation values and the background deviation value may be updated for the current image frame and used for choosing an applicable segmentation threshold.

In some example embodiments, the updating of the at least one weighting factor is based on the amount of chaotic noise, the segmentation mask noise determined at 616 of method 600, and the background noise determined at 624. The determining of the segmentation mask noise at 616 and the determining of the background noise at 624 may be carried out after the updating of the background model at 340 of method 700.

According to various example embodiments, the determining of the chaotic noise mask of the current image frame includes making, for each of a plurality of pixels of the current image frame, a comparison between the background deviation value for the given pixel with the statistical measure of the background deviation values of the plurality of pixels.

For example, a background deviation value is determined for each of the plurality of pixels of the current image frame. This may be done for each of the pixels in the current image frame. The background deviation values may be the background deviation values received at 316 or the background deviation values updated at 708. A statistical measure of the plurality of background deviation values is then calculated. This may be represented by the equation (where the statistical measure is a mean):

$$\text{BgStdMean}(n)=\text{Mean}(\text{BgStd}(x,y,n))$$ Equation 12:

where BgStdMean is the mean of the plurality of background deviation values.

When comparing the background deviation value of each pixel with the statistical measure of the plurality of background deviation values, the background deviation value may be weighted by a first weighting factor and the statistical measure of the background deviation values may be weighted by a second weighting factor. Accordingly, the first weighting factor is updated within method 700 based on the segmentation mask noise and the background noise. The second weighting factor is updated based on the amount of chaotic noise.

For each pixel, it is determined that the pixel exhibits chaotic noise if the background deviation value weighted by the second weighting factor is greater than the statistical measure of the background deviation values weighted by the first weighting factor. If the background deviation value weighted by the second weighting factor is less than the statistical measure of the background deviation values weighted by the first weighting factor, the pixel is determined as not exhibiting chaotic noise. For example, the comparison that is carried out to determine whether or not a pixel of the current image frame exhibits chaotic noise may be represented by the following equation:

$$\text{ChaoticMask}(x,y,n)=c2(n)*\text{BgStd}(x,y,n)>c1(n)*\text{BgStdMean}(n)$$ Equation 13:

It will be appreciated that determining the statistical measure of the background deviation values at equation 12 and determining the chaotic mask at equation 13 are based on the background deviation values, the first weighting factor and the second weighting factor, each as updated for the current image frame. Accordingly, the first weighting factor and the second weighting factor are updated for the current image frame but are applied for determining another new segmentation mask for the subsequent image. However, it will be understood that in other examples, the chaotic noise mask and the weighting factors may be updated prior to determining the new segmentation mask for the current frame and the updated weighting factors are applied for weighting the segmenting threshold when determining the new segmentation mask for the current image frame.

According to the example embodiments wherein the determining of the chaotic noise mask is based on the background deviation value weighted by the second weighting factor and the statistical measure of the background deviation values weighted by the first weighting factor, the first weighting factor and the second weighting factor are updated based on the noise of the segmentation mask, the noise of the background model and the noise of the chaotic mask. The noise of the segmentation mask and the noise of the background model may be determined according to the description provided with respect to FIG. 8. As further described herein, the amount of noise in the chaotic mask is determined by summing the chaotic noise pixels. The amount of noise in the chaotic mask may be further normalized, thereby producing a chaotic mask noise ratio. For example, the determination of the amount of noise in the chaotic noise mask and the chaotic mask noise ratio may be determined according to:

$$\text{ChaoticMaskNoise}(n) = \text{Sum}(\text{ChaoticMask}(x,y,n)) \quad \text{Equation 14:}$$

$$\text{ChaoticMaskRatio}(n) = \text{ChaoticMaskNoise}(n)/\text{<frame area>} \quad \text{Equation 15:}$$

According to one exemplary embodiment for updating the at least one weighting factor, the first weighting factor is decreased if the background noise is greater than the segmentation mask noise ratio and the chaotic mask noise ratio is less than a chaotic noise threshold. The second weighting factor is decreased if the background noise is greater than the segmentation mask noise ratio and the chaotic mask noise ratio is greater than the chaotic noise threshold. The first weighting factor is increased if the background noise is less than the segmentation mask noise ratio and the chaotic mask noise ratio is greater than a chaotic noise threshold. The second weighting factor is increased if the background noise is less than the segmentation mask noise ratio and the chaotic mask noise ratio is less than the chaotic noise threshold. The logical decisions for updating the weighting factor may be denoted by the following pseudocode:

```
if(SegMaskNoiseRatio(n)<C*BgNoiseRatio)
{
    if(ChaoticNoiseRatio<ChaoticThreshold)
        c1(n)=c1(n-1)*UpdateFactor;
    else
        c2(n)=c2(n-1)*UpdateFactor;
}
else
{
    if (ChaoticNoiseRatio>ChaoticThreshold)
        c1(n)=c1(n-1)/UpdateFactor;
    else
        c2(n)=c2(n-1)/UpdateFactor;
}
``` where the ChaoticThreshold corresponds to the desired amount of chaotic noise to be detected. According to various example embodiments, the ChaoticThreshold has a value of about 0.5.

It will be appreciated from the comparisons made for updating the weighting factors that the sensitivity for identifying a given pixel of the current image frame as belonging to the foreground is increased if the segmentation mask noise is low compared to the amount of background noise (if(SegMaskNoiseRatio(n)<C*BgNoiseRatio)). Conversely, it is decreased if the segmentation mask noise is high compared to the amount of background noise.

The value of the ChaoticThreshold is chosen so as to continually detect a level of chaotic noise. This will permit distinguishing between potential foreground pixels detected due to having a low (high sensitivity) segmenting threshold that is actually chaotic noise.

Referring back to Equations 11 and 12, the background deviation value for a given pixel weighted by the second weighting factor being greater than the statistical measure of the background deviation values weighted by the first weighting factor represents a situation where the pixel exhibits chaotic noise. Accordingly, the background deviation value weighted by the second weighting factor is chosen as the applicable threshold to determine the pixel as being a foreground pixel only if the difference between the image value of the pixel and the background model value for the pixel exceeds the chaotic noise. Otherwise, the statistical measure of the background deviation values weighted by the first weighting factor is chosen as the applicable threshold when the given pixel does not exhibit chaotic noise.

The example methods for segmenting a current image have been described herein for a current image frame within a sequence of image frames. These examples are applied for a frame of an ongoing image frame that is preceded by a plurality of previous image frames. According to various exemplary embodiments, to initialize the segmenting of images of a video, initial background model values, background average values and background deviation values may be determined based a plurality of image frames of the beginning of the video. For example, the initial background model values and the initial background average values may be each set to equal the pixel values of the first frame in the plurality of sequential pixel values. The initial segmentation mask may also be set to define all the pixels as being a background pixel. Furthermore, the initial background deviation values for each pixel is set to 0 and the initial instantaneous deviation values for each pixel is set to the maximum pixel values of the applicable color space. It will appreciated that this will cause the initial segmentation threshold to be high (low sensitivity), but over the course of several image frames, the background deviation values will be adjusted to an appropriate value. It will be understood that other methods of initialization may also be applied.

Various example embodiments described herein for segmenting a given current image frame into background and foreground areas may be further modified in some instances.

According to one example embodiment, the second learning rate is equal to the third learning rate, and both are adaptively adjusted together. The adjustment of these two learning rates allows for adapting to gradual light changes in the scene captured by a video capture device 108.

According to the example, an instantaneous trend value for a given pixel of the current image frame is calculated as the difference between the instantaneous deviation value and the background deviation value. For example, the determination of the instantaneous trend value may be represented by the equation:

$$\text{CurBgStdTrend}(x,y,n) = |\text{CurBgStd}(x,y,n) - \text{BgStd}(x,y,n)| \quad \text{Equation 16:}$$

where CurBgStdTrend is the instantaneous trend value for the given pixel of the current image frame.

A background trend value for the given pixel can be further determined based on a combination of the instantaneous trend value for the given pixel and a background trend value determined for the given pixel in a previous image frame. The determination of the background trend value may be further determined based on the segmentation mask, wherein the background trend value is only updated if the segmentation mask defines the given pixel as belonging to the background. The background trend value represents the trend of the deviation due to lighting changes. For example, the determination of the background trend value may be represented by the equation:

$$BgStdTrend(x,y,n)=$$
$$M(x,y,n-1)*BgStdTrend(x,y,n-1)+(1-M(x,y,n-1))$$
$$(d*CurBgStdTrend(x,y,n)+(1-d)BgStdTrend(x,y,n-1)) \quad \text{Equation 17:}$$

where BgStdTrend is the background trend value, and d is a fourth learning rate for combining the instantaneous trend value with the background trend value for a previous image frame.

An adaptive learning rate is then determined specifically for the given pixel of the current image frame based on the background trend value. This adaptive learning rate may be determined based on a combination of a basic learning rate and a fast learning rate that is weighted by a sigmoid of the background trend value. For example, the determination of the adaptive learning rate for the given pixel may be represented by the following equation:

$$g(x,y,n)=b+b2*\text{sigmoid}(f*BgStdTrend(x,y,n)) \quad \text{Equation 18:}$$

where b is the basic second learning rate, b2 is the fast second learning rate and f is a scaling coefficient that defines the slope of the sigmoid function.

The adaptive learning rate g(x,y,n) is then applied as the per pixel learning for updating the background deviation value. For example, equations 1 and 2 may be rewritten as $$BgMean(x,y,n)=M(x,y,n-1)*BgMean(x,y,n-1)+(1-M(x,y,n-1))*(g(x,y,n-1)*CurFrame(x,y,n)+(1-g(x,y,n-1))*BgMean(x,y,n-1)) \quad \text{Equation 19:}$$

$$BgStd(x,y,n)=M(x,y,n-1)*BgStd(x,y,n-1)+(1-M(x,y,n-1))*(g(x,y,n-1)*CurBgStd(x,y,n-1)+(1-g(x,y,n-1))*BgStd(x,y,n-1)) \quad \text{Equation 20:}$$

It will be appreciated that the example described herein determines the adaptive per pixel learning rate based on the instantaneous deviation value, the updated background deviation value and the computed segmentation mask. Accordingly, the adaptively adjusted per pixel learning rate is applied when updating the background deviation value for a subsequent image frame. It will be further appreciated that the rewritten equations 1 and 2 apply a received adaptively adjusted per pixel learning rate that was determined for a previous image frame.

However, it will be understood that in other examples, the adaptively adjusted per pixel learning rate may be determined based on a received background deviation value that was determined for a previous image frame. In such examples, the adaptively adjusted per pixel learning rate is then applied to update the background deviation value for the current image frame.

According to other examples, the updating of various values is adapted to take into account instantaneous lighting changes. Such changes may be caused from changes in camera gain.

In one example, a change in camera gain ratio of a given camera is received and background model values and background deviation values obtained for the video generated by that camera is adjusted accordingly.

In another example, the change in intensity can be determined by comparing an intensity of the background model values of an image frame against the intensity of the image values of the pixels in current image frame that correspond to background areas defined by the segmentation mask. For example, this may be done by comparing the background model intensity with the current frame intensity masked by the inverse of the segmentation mask. In some examples, this may be done separately for different areas of the background, such as by dividing the frame into blocks.

A change in intensity is calculated as a ratio. This ratio is then applied for adjusting the background model values, the background average values and the background deviation values. For example, the adjustments may be represented by the following equations:

$$BgModel(x,y,n)=BgModel(x,y,n)*IntensityChangeRatio(x,y,n) \quad \text{Equation 21:}$$

$$BgMean(x,y,n)=BgMean(x,y,n)*IntensityChangeRatio(x,y,n) \quad \text{Equation 22:}$$

$$BgStd(x,y,n)=BgStd(x,y,n)*IntensityChangeRatio(x,y,n) \quad \text{Equation 23:}$$

where IntensityChangeRatio is the instantaneous change in gain that is detected.

In various example embodiments for improving execution time, the segmenting is carried out for only one plane instead of multiple planes. That is, the image values for only one plane for each pixel is evaluated for segmenting an image frame. It will be appreciated that there is an improvement in execution speed when compared to using, for example, each of three color planes.

In one example, the intensity of each pixel is evaluated for segmenting an image frame.

In another example, only one color plane is used, such as using only the luma (Y) plane of a YUV color space.

It has been observed that the background deviation values for pixels change slowly over multiple image frames of a video. Accordingly, in some example embodiments for improving execution time, the background deviation values and the background average values for each image frame has a lower resolution than the full resolution of the image frames. An acceptably low amount of errors occur on the boundaries between foreground areas and background areas caused by the lower-resolution background deviation values.

In one example embodiment, a low resolution factor corresponds to the number of times that the resolution of the background deviation values is lower than the full resolution of the image frames. A full resolution is maintained when keeping the segmentation mask up to date. In row processing for an amount of pixels corresponding to the low resolution factor is applied when using both the background deviation values and one or more of the pixel values of an image frame, segmentation mask values and background model values. The resolution of the background model values and the background average values may also have a lower resolution than the full resolution of the image frames.

It has been further observed that in various situations, the image values of pixels corresponding to background areas change slowly over multiple image frames. Accordingly in one example embodiment, the background model value for a given pixel in a current image frame is updated only if the difference between the image value of the pixel for the current image frame and the background model value for that pixel exceeds a certain threshold and if the segmentation mask defines that pixel as belonging to the background. Otherwise, it is determined that the pixel continues to belong to a background area when updating the segmentation mask and its background model value remains unchanged. For example, the logical decisions for determining whether the background model value should be updated may be represented by the following pseudocode:

```
if(|CurFrame(x,y,n) - bgModel(x,y,n)| > NoiseThresh(x,y,n))
{
SegMask(x,y,n) = |CurFrame(x,y,n) - bgModel(x,y,n)| > T(x,y,n);
NoBgChangeOrFgMask(x,y,n) = SegMask(x,y,n);
}
else
{
SegMask(x,y,n) = false;
NoBgChangeOrFgMask(x,y,n) = true;
}
``` where NoBgChangeOrFgMask(x,y,n) denotes whether the background model value needs to be updated. According to the logical decisions provided above, the background model value for a given pixel is only updated when the NoBgChangeOrFgMask(x,y,n) is false. Furthermore, the updating of the background model value in equation 5 now has M(x,y,n) replaced by the inverse of NoBgChangeOrFgMask (x,y,n). It was observed that number of pixels where NoBgChangeOrFgMask(x,y,n) is false is significantly lower that the number of pixels defined as belonging to the background by the segmentation mask, thereby significantly lowering computational load and improving execution time.

In another example where motion information about the scene captured by a video capture device 108 is available, the determination of whether the background model value for a given pixel needs to be updated is further based on whether or not the motion information indicates that there is motion at the given pixel. Accordingly, the background model value is updated only if the difference between the image value of the pixel for the current image frame and the background model value for that pixel exceeds a certain threshold, if the segmentation mask defines that pixel as belonging to the background and if the motion information indicates that there is no motion at that pixel. For example, the logical decisions for determining whether the background model value should be updated may be represented by the following pseudocode:

```
If(|CurFrame(x,y,n) - bgModel(x,y,n)| > NoiseThresh(x,y,n))
{
If(MotionMask(x,y,n) == true)
{
SegMask(x,y,n) = |CurFrame(x,y,n) - bgModel(x,y,n)| >T(x,y,n);
}
else
{
SegMask(x,y,n) = false;
}
NoBgChangeOrFgMask(x,y,n) = SegMask(x,y,n);
}
else
{
SegMask(x,y,n) = false;
NoBgChangeOrFgMask(x,y,n) = true;
}
```

As described with reference to FIG. 2 and method 272, segmenting one or more frames of a video into foreground areas and background areas forms part of analyzing the video. Accordingly, the new segmentation mask determined at 332 of method 300 for segmenting each of one or more image frames is outputted or stored. The new segmentation mask for each of the one or more image frames is then used to detect foreground objects captured in the scene represented by the image frames. From these detected foreground objects, metadata may be generated, the objects may be classified and/or events corresponding to the objects may be detected.

Figure 10:
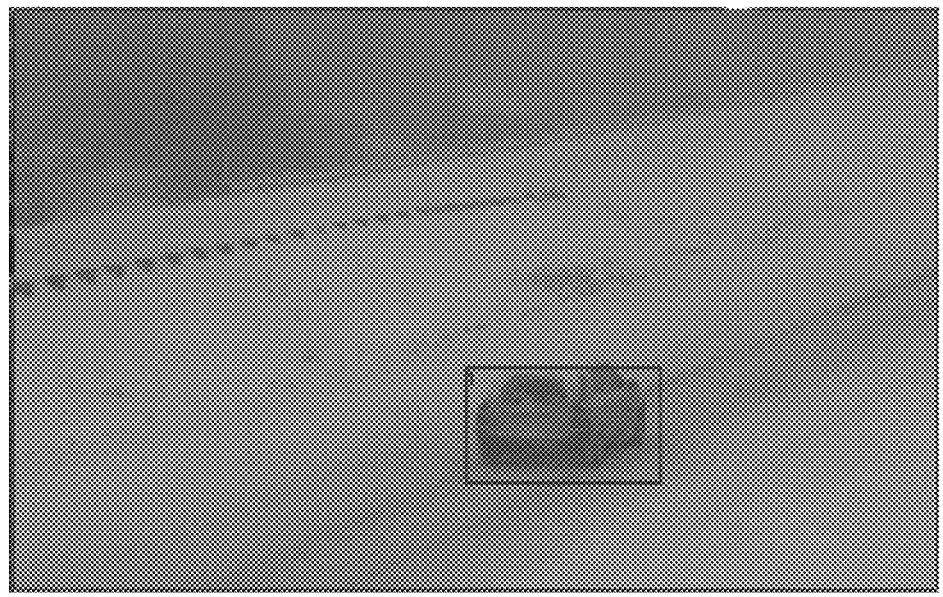
FIG. 10 illustrates an image frame in which an object in the captured scene corresponding to a foreground area defined in the new segmentation mask has been detected.

FIG. 10 is an image frame in which an object in the captured scene (a car in this example) has been detected and identified using a bounding box. It will be appreciated that the detected object corresponds to the contiguous foreground area defined the new segmentation mask illustrated in FIG. 6B.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A computer-implemented method for segmenting a current frame of a video, the method comprising:
   receiving, at a processor, a segmentation mask determined from a previous frame of the video;
   receiving, at the processor, a background model value and a background deviation value for a given pixel of a previous frame of the video;
   updating, using the processor, the received background deviation value;
   updating, using the processor, the background model value independently of the updating of the background deviation value;
   determining, using the processor, a value of a pixel of a new segmentation mask corresponding to the given pixel based on a foreground model value of the current frame, a segmenting background model value of the current frame and a segmentation threshold, the determining of the new segmentation mask defining whether the given pixel is a foreground pixel or a background pixel of the current frame; and
   applying, using the processor, the new segmentation mask to the current frame to determine whether the given pixel is a foreground pixel or a background pixel of the current frame;
   wherein the segmenting background model value is one of the received background model value and the updated background model value; and
   wherein the segmentation threshold is based on one of the received background deviation and the updated background deviation value.

2. The method of claim 1, wherein the updating of the received background deviation value for the given pixel is based on the received background deviation value and one of the received segmentation mask and the new segmentation mask; and
   wherein the updating of the received background model value for the given pixel is based on the received background model value and one of the received segmentation mask and the new segmentation mask.

3. The method of claim 1, wherein the background model value is updated based on the received background model value weighted by a first learning rate, a value of the given pixel of the current frame weighted by a complementary value of the first learning rate, and whether one of the received segmentation mask and the new segmentation mask defines the given pixel as corresponding to a foreground area or a background area.

4. The method of claim 1, wherein updating the background deviation value for the given pixel comprises:

receiving a background average value for the given pixel;
updating the background average value based on the received background average value weighted by a second learning rate and the value of the given pixel of the current frame weighted by a complementary value of the second learning rate;
determining a current deviation value as the difference between the value of the given pixel of the current frame and the updated background average value; and
updating the background deviation value based on the received background deviation value weighted by the second learning rate and the value of the given pixel of the current frame weighted by the complementary value of the second learning rate.

5. The method of claim 1, wherein updating the background deviation value is carried out for each pixel of the current frame, thereby generating an updated deviation model;
wherein updating the background model is carried out for each pixel of the current frame, thereby generating an updated background model; and
wherein determining the new segmentation mask is carried out for each pixel of the current frame, the determining of the new segmentation mask comprising:
for each pixel, comparing the difference between the value of the pixel and the background model value of the pixel against the segmentation threshold for the pixel, thereby generating a raw segmentation mask; and
filtering the raw segmentation mask, thereby generating the new segmentation mask.

6. The method of claim 1, further comprising:
determining a noise ratio of one of the received segmentation mask and the new segmentation mask;
determining a background noise ratio of one or more areas of the current frame corresponding to the one or more background areas defined by the one of the received segmentation mask and the new segmentation mask;
receiving a first weighting factor;
updating the weighting factor based on the segmentation mask noise ratio and the background noise ratio; and
wherein determining the value of the pixel of the new segmentation mask corresponding to the given pixel is based on the segmentation threshold weighted by one of the received weighting factor and the updated weighting factor.

7. The method of claim 6, wherein updating the weighting factor comprises:
decreasing the weighting factor if the background noise ratio is greater than the segmentation noise ratio;
increasing the weighting factor if the background noise ratio is less than the segmentation noise ratio;
wherein the value of the pixel of the new segmentation mask corresponding to the given pixel is set to define a foreground pixel if the difference between the value of the corresponding pixel of the foreground model and the value of the corresponding pixel of the segmenting background model is greater than the segmentation threshold weighted by one of the received weighting factor and the updated weighting factor; and
wherein the value of the pixel of the new segmentation mask corresponding to the given pixel is set to define a background pixel if the difference between the value of the corresponding pixel of the foreground model and the value of the corresponding pixel of the segmenting background model is less than the segmentation threshold weighted by the one of the received weighting factor and the updated weighting factor.

8. The method of claim 5, further comprising:
for a subsequent frame of the video, receiving the updated deviation model value;
for the subsequent frame, receiving the updated background model value;
for the subsequent frame, receiving the new segmentation mask;
further updating the updated deviation model value based on properties of the subsequent frame;
further updating the updated background model value based on properties of the subsequent frame; and
further determining another new segmentation mask based on properties of the subsequent frame.

9. The method of claim 5, further comprising:
determining a statistical measure of the deviation values calculated for each of the plurality of pixels;
for each of the plurality of pixels, determining whether each pixel belongs to a chaotic noise area or a non-chaotic noise area based on a comparison of the statistical measure of the background deviation values with the background deviation value for the pixel, thereby generating a chaotic noise mask;
determining a noise ratio of the chaotic noise mask;
receiving a second weighting factor;
updating at least one of the first weighting factor and the second weighting factor based on whether the chaotic noise mask noise ratio exceeds a chaotic noise threshold; and
defining the statistical measure of the background deviation values weighted by the first weighting factor as the segmentation threshold for determining the value of the pixel of the new segmentation mask if the statistical measure of the background deviation values weighted by the first weighting factor is greater than the background deviation value weighted by the second weighting factor; and
defining the background deviation value for the pixel weighted by the second weighting factor as the segmentation threshold for determining the value of the pixel of the new segmentation mask if the background deviation value for the pixel weighted by the second weighting factor is greater than the statistical measure of the background deviation values weighted by the first weighting factor.

10. The method of claim 9, wherein determining whether each pixel belongs to the chaotic noise area or the non-chaotic noise area comprises defining the pixel as belonging to the chaotic noise area if the background deviation value for the pixel weighted by the second weighting factor is greater than the statistical measure of the background deviation values weighted by the second weighting factor and defining the pixel as belonging to the non-chaotic noise area if the background deviation value for the pixel weighted by the second weighting factor is less than the statistical measure of the background deviation values weighted by the first weighting factor;
wherein the at least one segmentation threshold comprises a first segmentation threshold being the statistical measure of the background deviation values and a second segmentation threshold being the background deviation value for the pixel; and
wherein updating each pixel of the segmentation mask is based on the first segmentation threshold weighted by the first weighting factor and the second segmentation threshold weighted by the second weighting factor.

11. A system for segmenting a current frame of a video, the system comprising:
a processor;
a computer-readable storage device storing program instructions that when executed by the processor, cause the system to perform operations comprising:
receiving, at the processor, a segmentation mask determined from a previous frame of the video;
receiving, at the processor, a background model value and a background deviation value for a given pixel of a previous frame of the video;
updating, using the processor, the received background deviation value;
updating, using the processor, the background model value independently of the updating of the background deviation value;
determining, using the processor, a value of a pixel of a new segmentation mask corresponding to the given pixel based on a foreground model value of the current frame, a segmenting background model value of the current frame and a segmentation threshold, the determining of the new segmentation mask defining whether the given pixel is a foreground pixel or a background pixel of the current frame; and
applying, using the processor, the new segmentation mask to the current frame to determine whether the given pixel is a foreground pixel or a background pixel of the current frame;
wherein the segmenting background model value is one of the received background model value and the updated background model value; and
wherein the segmentation threshold is based on one of the received background deviation and the updated background deviation value.

12. The system of claim 11, wherein the updating of the received background deviation value for the given pixel is based on the received background deviation value and one of the received segmentation mask and the new segmentation mask; and
wherein the updating of the received background model value for the given pixel is based on the received background model value and one of the received segmentation mask and the new segmentation mask.

13. The system of claim 11, wherein the background model value is updated based on the received background model value weighted by a first learning rate, a value of the given pixel of the current frame weighted by a complementary value of the first learning rate, and whether one of the received segmentation mask and the new segmentation mask defines the given pixel as corresponding to a foreground area or a background area.

14. The system of claim 11, wherein updating the background deviation value for the given pixel comprises:
receiving a background average value for the given pixel;
updating the background average value based on the received background average value weighted by a second learning rate and the value of the given pixel of the current frame weighted by a complementary value of the second learning rate;
determining a current deviation value as the difference between the value of the given pixel of the current frame and the updated background average value;
updating the background deviation value based on the received background deviation value weighted by the second learning rate and the value of the given pixel of the current frame weighted by a complementary value of the second learning rate.

15. The system of claim 11, wherein updating the background deviation value is carried out for each pixel of the current frame, thereby generating an updated deviation model;
wherein updating the background model is carried out for each pixel of the current frame, thereby generating an updated background model; and
wherein determining the new segmentation mask is carried out for each pixel of the current frame, the determining of the new segmentation mask comprising:
for each pixel, comparing the difference between the value of the pixel and the background model value of the pixel against the segmentation threshold for the pixel, thereby generating a raw segmentation mask; and
filtering the raw segmentation mask, thereby generating the new segmentation mask.

16. The system of claim 11, wherein the operations further comprise:
determining a noise ratio of one of the received segmentation mask and the new segmentation mask;
determining a background noise ratio of one or more areas of the current frame corresponding to the one or more background areas defined by the one of the received segmentation mask and the new segmentation mask;
receiving a first weighting factor;
updating the weighting factor based on the segmentation mask noise ratio and the background noise ratio; and
wherein determining the value of the pixel of the new segmentation mask corresponding to the given pixel is based on the segmentation threshold weighted by one of the received weighting factor and the updated weighting factor.

17. The system of claim 16, wherein updating the weighting factor comprises:
decreasing the weighting factor if the background noise ratio is greater than the segmentation noise ratio;
increasing the weighting factor if the background noise ratio is less than the segmentation noise ratio;
wherein the value of the pixel of the new segmentation mask corresponding to the given pixel is set to define a foreground pixel if the difference between the value of the corresponding pixel of the foreground model and the value of the corresponding pixel of the segmenting background model is greater than the segmentation threshold weighted by one of the received weighting factor and the updated weighting factor; and
wherein the value of the pixel of the new segmentation mask corresponding to the given pixel is set to define a background pixel if the difference between the value of the corresponding pixel of the foreground model and the value of the corresponding pixel of the segmenting background model is less than the segmentation threshold weighted by the one of the received weighting factor and the updated weighting factor.

18. The system of claim 15, wherein the operations further comprise:
for a subsequent frame of the video, receiving the updated deviation model value;
for the subsequent frame, receiving the updated background model value;
for the subsequent frame, receiving the new segmentation mask;
further updating the updated deviation model value based on properties of the subsequent frame;
further updating the updated background model value based on properties of the subsequent frame; and further determining another the new segmentation mask based on properties of the subsequent frame.

19. The system of claim 15, wherein the operations further comprise:
   determining a statistical measure of the deviation values calculated for each of the plurality of pixels;
   for each of the plurality of pixels, determining whether each pixel belongs to a chaotic noise area or a non-chaotic noise area based on a comparison of the statistical measure of the background deviation values with the background deviation value for the pixel, thereby generating a chaotic noise mask;
   determining a noise ratio of the chaotic noise mask;
   receiving a second weighting factor;
   updating at least one of the first weighting factor and the second weighting factor based on whether the chaotic noise mask noise ratio exceeds a chaotic noise threshold; and
   defining the statistical measure of the background deviation values weighted by the first weighting factor as the segmentation threshold for determining the value of the pixel of the new segmentation mask if the statistical measure of the background deviation values weighted by the first weighting factor is greater than the background deviation value weighted by the second weighting factor; and
   defining the background deviation value for the pixel weighted by the second weighting factor as the segmentation threshold for determining the value of the pixel of the new segmentation mask if the background deviation value for the pixel weighted by the second weighting factor is greater than the statistical measure of the background deviation values weighted by the first weighting factor.

20. The system of claim 19, wherein determining whether each pixel belongs to the chaotic noise area or the non-chaotic noise area comprises defining the pixel as belonging to the chaotic noise area if the background deviation value for the pixel weighted by the second weighting factor is greater than the statistical measure of the background deviation values weighted by the second weighting factor and defining the pixel as belonging to the non-chaotic noise area if the background deviation value for the pixel weighted by the second weighting factor is less than the statistical measure of the background deviation values weighted by the first weighting factor;
   wherein the at least one segmentation threshold comprises a first segmentation threshold being the statistical measure of the background deviation values and a second segmentation threshold being the background deviation value for the pixel; and
   wherein updating each pixel of the segmentation mask is based on the first segmentation threshold weighted by the first weighting factor and the second segmentation threshold weighted by the second weighting factor.

* * * * *